(12) United States Patent
Isami

(10) Patent No.: US 11,448,267 B2
(45) Date of Patent: Sep. 20, 2022

(54) CONTROL DEVICE FOR POWER TRANSMISSION MECHANISM

(71) Applicant: TOYOTA JIDOSHA KABUSHIKI KAISHA, Toyota (JP)

(72) Inventor: Yoichiro Isami, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 114 days.

(21) Appl. No.: 17/075,363

(22) Filed: Oct. 20, 2020

(65) Prior Publication Data

US 2021/0148414 A1    May 20, 2021

(30) Foreign Application Priority Data

Nov. 18, 2019   (JP) .............................. JP2019-207999

(51) Int. Cl.
*F16H 63/18*   (2006.01)
*F16D 23/00*   (2006.01)
(Continued)

(52) U.S. Cl.
CPC .............. *F16D 23/00* (2013.01); *B60K 17/02* (2013.01); *B60T 1/005* (2013.01); *F16D 11/14* (2013.01);
(Continued)

(58) Field of Classification Search
CPC ...... F16D 23/00; F16D 11/14; F16D 2125/38; F16D 2300/00; F16D 2300/14; F16D 48/06; B60K 17/02; B60T 1/005; B60T 1/062; B60T 2220/00; B60T 2250/04; F16H 61/32; F16H 63/18; F16H 3/44; F16H 59/02; F16H 63/3416; F16H 2200/20; F16H 2200/203
See application file for complete search history.

(56) References Cited

U.S. PATENT DOCUMENTS

2007/0227283 A1* 10/2007 Fujimoto ............ F16H 61/0059
74/337.5
2009/0038430 A1*  2/2009 Itazu ................... F16H 63/3458
74/503
(Continued)

FOREIGN PATENT DOCUMENTS

CN         102297247 A  * 12/2011  ......... F16H 61/0059
DE  10 2014 212 751 A1    1/2016
(Continued)

*Primary Examiner* — Justin Holmes
(74) *Attorney, Agent, or Firm* — Oliff PLC

(57) ABSTRACT

A control device for a power transmission mechanism includes a controller. The power transmission mechanism includes an engagement mechanism and an operation mechanism including a movable member and a guide member. The guide member includes a plurality of guide areas being configured to move relative to the movable member to guide the movable member to an engaging position or to a disengaging position. The controller is configured to switch, when determining that a predetermined condition related to traveling of the vehicle is satisfied, a contact guide area that is in contact with the movable member to guide the movable member to the engaging position or to the disengaging position, from a first guide area to a second guide area that are included in the plurality of guide areas.

13 Claims, 15 Drawing Sheets

(51) Int. Cl.
  *B60K 17/02* (2006.01)
  *B60T 1/00* (2006.01)
  *F16D 11/14* (2006.01)
  *F16H 61/32* (2006.01)
  *F16D 125/38* (2012.01)
  *B60T 1/06* (2006.01)

(52) U.S. Cl.
  CPC ............ *F16H 61/32* (2013.01); *F16H 63/18* (2013.01); *B60T 1/062* (2013.01); *B60T 2220/00* (2013.01); *B60T 2250/04* (2013.01); *F16D 2125/38* (2013.01); *F16D 2300/00* (2013.01); *F16D 2300/14* (2013.01)

(56) References Cited

U.S. PATENT DOCUMENTS

| | | |
|---|---|---|
| 2015/0247574 A1 | 9/2015 | VanDruten et al. |
| 2017/0037967 A1 | 2/2017 | Semet |

FOREIGN PATENT DOCUMENTS

| | | | |
|---|---|---|---|
| EP | 1286088 A1 * | 2/2003 | ............ F16H 63/18 |
| EP | 2 093 463 A1 | 8/2009 | |
| EP | 2 256 378 A1 | 12/2010 | |
| JP | H07-127670 A | 5/1995 | |
| JP | 2005-214215 A | 8/2005 | |
| JP | 2017-515072 A | 6/2017 | |
| JP | 2018-035918 A | 3/2018 | |

\* cited by examiner

FIG. 4

| DRIVING MODE | | CL1 | CL2 | F | MG1 | MG2 | ENG |
|---|---|---|---|---|---|---|---|
| HV DRIVING MODE | HV-LOW MODE | ● | – | – | G | M | ON |
| | HV-HIGH MODE | – | ● | – | G | M | ON |
| | DIRECT MODE | ● | ● | – | | M | ON |
| EV DRIVING MODE | DUAL-MOTOR MODE | EV-LOW MODE | – | – | ● | M | M | OFF |
| | | EV-HIGH MODE | – | ● | ● | M | M | OFF |
| | SINGLE-MOTOR MODE | – | – | – | | M | OFF |

CONTROL DEVICE FOR POWER TRANSMISSION MECHANISM

CROSS-REFERENCE TO RELATED APPLICATION

This application claims priority to Japanese Patent Application No. 2019-207999 filed on Nov. 18, 2019, incorporated herein by reference in its entirety.

BACKGROUND

1. Technical Field

The present disclosure relates to a control device for a power transmission mechanism, including an engagement mechanism configured to switch an engaged state in which a torque for causing a vehicle to travel is transmitted and a disengaged state in which the torque is interrupted.

2. Description of Related Art

Japanese Unexamined Patent Application Publication No. 7-127670 (JP 7-127670 A), Japanese Unexamined Patent Application Publication (Translation of PCT Application) No. 2017-515072 (JP 2017-515072 A), and Japanese Unexamined Patent Application Publication No. 2005-214215 (JP 2005-214215 A) describe a gear shifting mechanism including a shift drum having a plurality of cam grooves, a plurality of pins engaging with the respective cam grooves, and a plurality of shift forks configured to move together with the respective pins. In the gear shifting mechanism having this structure, the rotation angle of the shift drum is controlled to be a predetermined angle, and therefore a predetermined shift fork moves in an axial direction to achieve a predetermined gear stage. Further, the rotation angle is controlled to be another angle, and therefore another shift fork moves in the axial direction to achieve another gear stage. That is, the gear stage is controlled by controlling the rotation angle of the shift drum.

When the rotation angle of the shift drum is changed as described above, the pins slide along the cam grooves. Therefore, the cam grooves and the pins are likely to be worn out in actuating areas within the rotation angle of the shift drum where the shift forks move in the axial direction. In the gear shifting mechanism described in JP 2017-515072 A, a portion of the cam groove where the pin moves such that the shift fork moves in the axial direction has a curved shape determined based on a spline function.

In the gear shifting mechanism having the structure described above, the gear stages are shifted in order of, for example, first forward gear, second forward gear, and third forward gear. To shift first forward gear to third forward gear, second forward gear is set temporarily. Therefore, the gear shifting time may increase, or abnormal noise may be generated because second forward gear is set. In the gear shifting mechanism described in JP 2005-214215 A, a movable member is provided in the cam groove, and is movable between a position where the pin is guided in the axial direction and a position where the axial movement of the pin is prohibited.

In a gear shifting mechanism described in Japanese Unexamined Patent Application Publication No. 2018-35918 (JP 2018-35918 A), the side face of the cam groove and the side face of the pin are brought into contact with each other at two points to reduce the occurrence of a case where the shift fork moves with a tilt.

SUMMARY

In the gear shifting mechanisms described in JP 7-127670 A and JP 2005-214215 A, the pins slide along the cam grooves by changing the rotation angle of the shift drum, and the pins move in the axial direction depending on the shapes of the cam grooves. When a vehicle having the gear shifting mechanism travels by using, for example, a low gear stage relatively frequently, the pins frequently move back and forth in predetermined areas of the cam grooves. Even at the same gear stage, the pins slide in the cam grooves due to, for example, vibrations of the vehicle. When the pins slide in the predetermined areas of the cam grooves, the predetermined areas may excessively be worn out as compared to the other areas. Such local wear may affect the gear shifting control to cause, for example, failure in accurate control for the positions of the shift forks.

The present disclosure provides a control device for a power transmission mechanism, which can reduce the occurrence of a case where a guide member in contact with a movable member is locally worn out.

One aspect of the present disclosure relates to a control device for a power transmission mechanism. The power transmission mechanism includes an engagement mechanism and an operation mechanism. The engagement mechanism is configured to be switched between an engaged state in which a torque for causing a vehicle to travel is transmitted and a disengaged state in which the torque is interrupted. The operation mechanism is configured to switch the engagement mechanism between the engaged state and the disengaged state. The operation mechanism includes a movable member and a guide member. The movable member is coupled to the engagement mechanism and configured to move to an engaging position where the engagement mechanism is set to the engaged state, and to move to a disengaging position where the engagement mechanism is set to the disengaged state. The guide member is provided in contact with the movable member and configured to move the movable member to the engaging position or to the disengaging position. The guide member includes a plurality of guide areas provided in a continuous manner. Each of the guide areas being configured to move relative to the movable member to guide the movable member to the engaging position or to the disengaging position. The control device comprising a controller that is configured to control the operation mechanism. The controller is configured to determine whether a predetermined condition related to traveling of the vehicle is satisfied. The controller is further configures to switch, when determining that the predetermined condition is satisfied, a contact guide area that is in contact with the movable member to guide the movable member to the engaging position or to the disengaging position from a first guide area that is included in the plurality of guide areas and that has been in contact with the movable member to a second guide area that is included in the plurality of guide areas.

In the aspect described above, the second guide area may include a part of the first guide area.

In the aspect described above, the predetermined condition may include a condition that a vehicle speed is lower than a predetermined vehicle speed.

In the aspect described above, the predetermined condition may include a request to switch an untravelable state to a travelable state.

In the aspect described above, the predetermined condition may include a request to switch a travelable state to an untravelable state.

In the aspect described above, the power transmission mechanism may include a parking lock mechanism configured to prohibit rotation of a driving wheel. The predetermined condition may include a request to prohibit the rotation of the driving wheel by the parking lock mechanism.

In the aspect described above, the controller may be configured to: determine a cumulative value of a traveling distance after the movable member is brought into contact with the first guide area to guide the movable member to the engaging position or to the disengaging position; and switch, when the cumulative value of the traveling distance is equal to or larger than a threshold, the contact guide area that is in contact with the movable member to guide the movable member to the engaging position or to the disengaging position from the first guide area to the second guide area.

In the aspect described above, the controller may be configured to: determine a first usage rate corresponding to a period during which the movable member is brought into contact with the first guide area to guide the movable member to the engaging position or to the disengaging position relative to a traveling period of the vehicle; and switch, when the first usage rate is equal to or larger than a predetermined value, the contact guide area that is in contact with the movable member to guide the movable member to the engaging position or to the disengaging position from the first guide area to the second guide area.

In the aspect described above, the guide member may include three or more guide areas. The controller may be configured to: determine, for the respective guide areas, individual usage rates corresponding to periods during which the movable member is brought into contact with the guide areas to guide the movable member to the engaging position or to the disengaging position relative to the traveling period of the vehicle; and set, as the second guide area, a guide area having a lowest individual usage rate among the individual usage rates.

In the aspect described above, the power transmission mechanism may be configured to change increase rates of a torque to be transmitted from a drive source of the vehicle to a driving wheel by switching the engaged state and the disengaged state of the engagement mechanism. Each of the guide areas may be configured such that the guide member moves relative to the movable member to set at least two increase rates out of the increase rates of the torque to be transmitted from the drive source of the vehicle to the driving wheel.

In the aspect described above, the predetermined condition may include a condition that a requested driving force of the vehicle is equal to or smaller than a predetermined driving force.

In the aspect described above, the predetermined driving force may be set to a driving force at which an amount of change in an acceleration of the vehicle in a process of switching the contact guide area, that is in contact with the movable member to guide the movable member to the engaging position or to the disengaging position, from the first guide area to the second guide area is equal to or smaller than a predetermined change amount.

In the aspect described above, the vehicle may further include a rotational member and a motor. The rotational member is configured to transmit a torque from the power transmission mechanism. The motor is configured to change the torque of the rotational member. The predetermined driving force may be set to a driving force at which an amount of change in the torque to be transmitted to the rotational member in the process of switching the contact guide area, that is in contact with the movable member to guide the movable member to the engaging position or to the disengaging position, from the first guide area to the second guide area is equal to or smaller than an amount of change in the torque to be transmitted to the rotational member when a torque of the motor is changed to an upper limit torque.

In the aspect described above, the controller may be configured to switch the contact guide area, that is in contact with the movable member to guide the movable member to the engaging position or to the disengaging position from the first guide area to the second guide area such that an increase rate of the torque before switching of the contact guide area is the same as an increase rate of the torque after switching of the contact guide area.

According to the aspect described above, the power transmission mechanism includes the movable member configured to move to the engaging position where the engagement mechanism is set to the engaged state, and to move to the disengaging position where the engagement mechanism is set to the disengaged state, and the guide member provided in contact with the movable member and configured to move the movable member to the engaging position or to the disengaging position. The guide member includes the plurality of guide areas provided in a continuous manner, and each of the guide areas is configured to move relative to the movable member to guide the movable member to the engaging position or to the disengaging position. When the predetermined condition is satisfied, the contact guide areas that is in contact with the movable member to guide the movable member to the engaging position or to the disengaging position are switched from the first guide area to the second guide area. Therefore, even if the engagement mechanism is frequently set to the engaged state or the disengaged state, the position on the guide member where the movable member frequently slides is dispersed into at least two parts. Thus, it is possible to reduce the occurrence of a case where the guide member is locally worn out. That is, a decrease in the durability of the guide member can be suppressed. Further, the frequency of sliding between the movable member and the guide member can be reduced as compared to a case where the guide area is not changed. Therefore, it is possible to reduce the number of processes for reducing friction of the guide member, such as surface treatment or machining on the sliding surface of the guide member, or to reduce the size of the guide member. Since the amount of wear in the guide member can be reduced, deviation of the position of the movable member from an intended position in the guide member can be suppressed. Thus, deviation of timing to switch the engaged state to the disengaged state or to switch the disengaged state to the engaged state in the engagement mechanism can be suppressed in the engagement mechanism. That is, a decrease in controllability of the engagement mechanism can be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a diagram collectively illustrating whether the clutch mechanisms and a one-way clutch are engaged or disengaged, operating conditions of motors, and whether an engine is driven in respective driving modes;

DETAILED DESCRIPTION OF EMBODIMENTS

Figure 1:
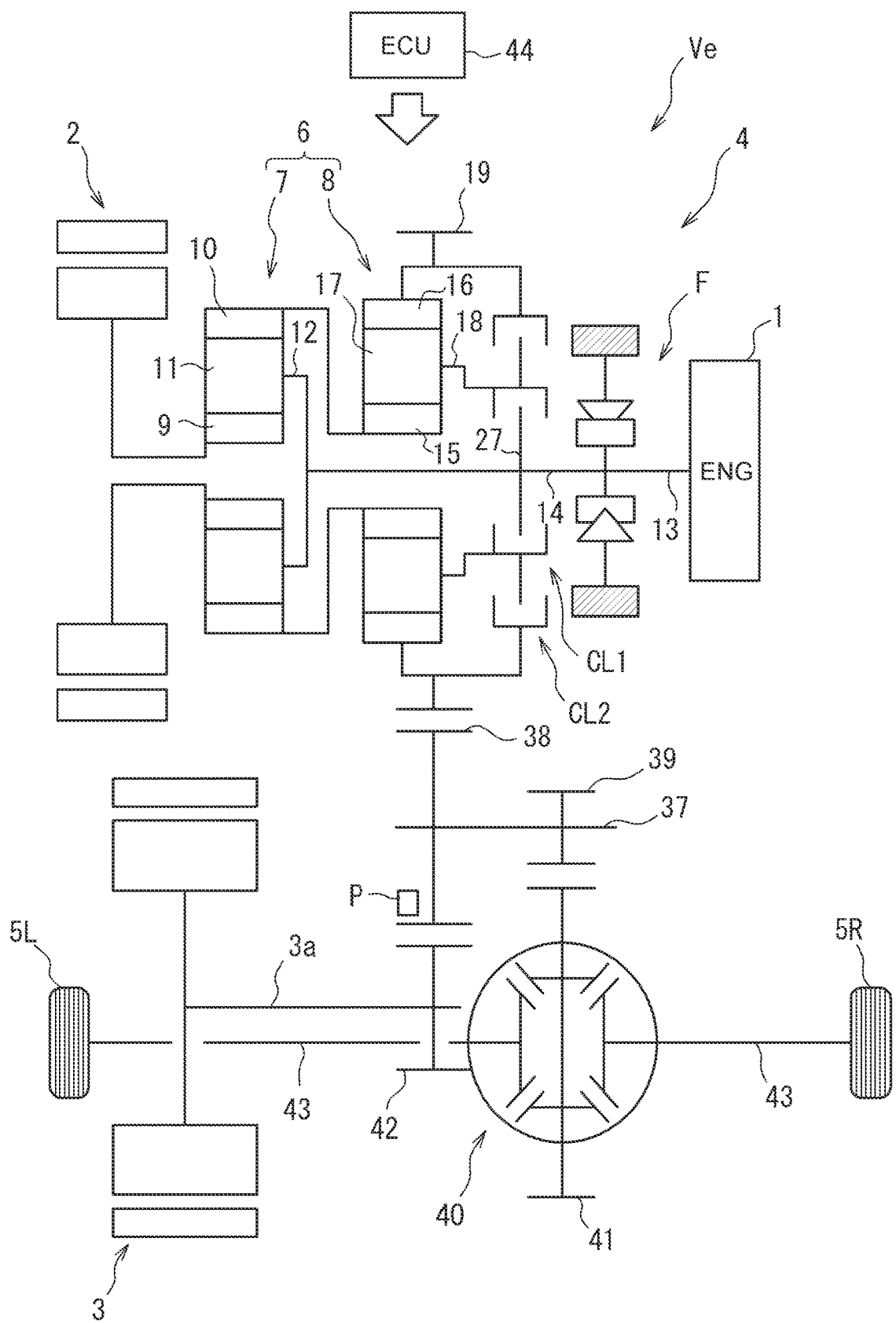
FIG. 1 is a skeleton diagram for describing an example of a vehicle according to an embodiment of the present disclosure.

An example of a vehicle Ve according to an embodiment of the present disclosure is described with reference to FIG. 1. FIG. 1 illustrates a hybrid drive device 4 (hereinafter referred to simply as a drive device 4) including an engine (ENG) 1 and two motors 2 and 3. The engine 1 and motors 2 and 3 are examples of a "drive source" according to the embodiment of the present disclosure. The drive device 4 drives front wheels (driving wheels) 5R and 5L. The first motor 2 is a motor having a function of generating electric power (that is, a motor generator: MG1). The first motor 2 controls the rotational speed of the engine 1. The second motor 3 is driven by electric power generated by the first motor 2, and a torque output from the second motor 3 can be added to a driving torque for traveling. The second motor 3 is an example of a "motor" according to the embodiment of the present disclosure, and may be a motor having a function of generating electric power (that is, a motor generator: MG2). Each of the first motor 2 and the second motor 3 may be an alternating current (AC) motor such as a permanent-magnet synchronous motor having permanent magnets attached to a rotor.

A power split device 6 is coupled to the engine 1. The power split device 6 includes a splitting unit 7 and a gear shifting unit 8. The splitting unit 7 mainly has a function of splitting a torque output from the engine 1 into a torque on the first motor 2 side and a torque on an output side. The gear shifting unit 8 mainly has a function of changing a torque split ratio.

The splitting unit 7 may have a structure for performing a differential action by using three rotational elements, and a planetary gearing mechanism may be employed. In the example illustrated in FIG. 1, the splitting unit 7 is a single-pinion planetary gearing mechanism (first differential mechanism). The splitting unit 7 illustrated in FIG. 1 includes a sun gear 9, a ring gear 10, pinion gears 11, and a carrier 12. The ring gear 10 is an annulus gear arranged concentrically with the sun gear 9. The pinion gears 11 are arranged between the sun gear 9 and the ring gear 10, and mesh with the sun gear 9 and the ring gear 10. The carrier 12 retains the pinion gears 11 such that each pinion gear 11 is rotatable about its axis and about the sun gear 9.

The torque output from the engine 1 is input to the carrier 12. Specifically, an input shaft 14 of the power split device 6 is coupled to an output shaft 13 of the engine 1, and is also coupled to the carrier 12. The first motor 2 is coupled to the sun gear 9. In place of the structure in which the carrier 12 and the input shaft 14 are directly coupled together, the carrier 12 and the input shaft 14 may be coupled together via a power transfer mechanism such as a gear mechanism (not illustrated). Further, a damper mechanism, a torque converter, or other mechanisms (not illustrated) may be arranged between the output shaft 13 and the input shaft 14. In place of the structure in which the first motor 2 and the sun gear 9 are directly coupled together, the first motor 2 and the sun gear 9 may be coupled together via a power transfer mechanism such as a gear mechanism (not illustrated).

The gear shifting unit 8 is a single-pinion planetary gearing mechanism. That is, the gear shifting unit 8 includes a sun gear 15, a ring gear 16, pinion gears 17, and a carrier 18 similarly to the splitting unit 7. The ring gear 16 is an annulus gear arranged concentrically with the sun gear 15. The pinion gears 17 are arranged between the sun gear 15 and the ring gear 16, and mesh with the sun gear 15 and the ring gear 16. The carrier 18 retains the pinion gears 17 such that each pinion gear 17 is rotatable about its axis and about the sun gear 15. Thus, the gear shifting unit 8 is a differential mechanism (second differential mechanism) configured to perform a differential action by using three rotational elements that are the sun gear 15, the ring gear 16, and the carrier 18. The ring gear 10 of the splitting unit 7 is coupled to the sun gear 15 of the gear shifting unit 8. An output gear 19 is coupled to the ring gear 16 of the gear shifting unit 8.

The gear shifting unit 8 includes a first clutch mechanism (first engagement mechanism). The first clutch mechanism CL1 is provided such that the splitting unit 7 and the gear shifting unit 8 constitute a combined planetary gearing mechanism. The first clutch mechanism CL1 selectively couples the carrier 18 of the gear shifting unit 8 to the carrier 12 of the splitting unit 7 and to the input shaft 14. The first clutch mechanism CL1 may be a friction clutch mechanism or a dog clutch mechanism. The carrier 12 of the splitting unit 7 and the carrier 18 of the gear shifting unit 8 are coupled together by engaging the first clutch mechanism CL1. Thus, the combined planetary gearing mechanism is formed such that the carrier 12 and the carrier 18 serve as an input element, the sun gear 9 of the splitting unit 7 serves as a reaction element, and the ring gear 16 of the gear shifting unit 8 serves as an output element.

The gear shifting unit 8 includes a second clutch mechanism CL2 (second engagement mechanism). The second clutch mechanism CL2 is provided to integrate all the portions of the gear shifting unit 8. The second clutch mechanism CL2 couples at least two rotational elements of the gear shifting unit 8. For example, the second clutch mechanism CL2 couples the carrier 18 to the ring gear 16 or the sun gear 15, or couples the sun gear 15 and the ring gear 16 together. The second clutch mechanism CL2 may be a friction clutch mechanism or a dog clutch mechanism similarly to the first clutch mechanism CL1. In the example illustrated in FIG. 1, the second clutch mechanism CL2 couples the carrier 18 and the ring gear 16 of the gear shifting unit 8. The rotational elements of the gear shifting unit 8 integrally rotate by engaging the second clutch mechanism CL2. Thus, the carrier 12 of the splitting unit 7 serves as an input element, the sun gear 9 of the splitting unit 7 serves as a reaction element, and the ring gear 16 of the gear shifting unit 8 serves as an output element. The first clutch mechanism CL1 and the second clutch mechanism CL2 are examples of an "engagement mechanism" according to the embodiment of the present disclosure.

Figure 2:
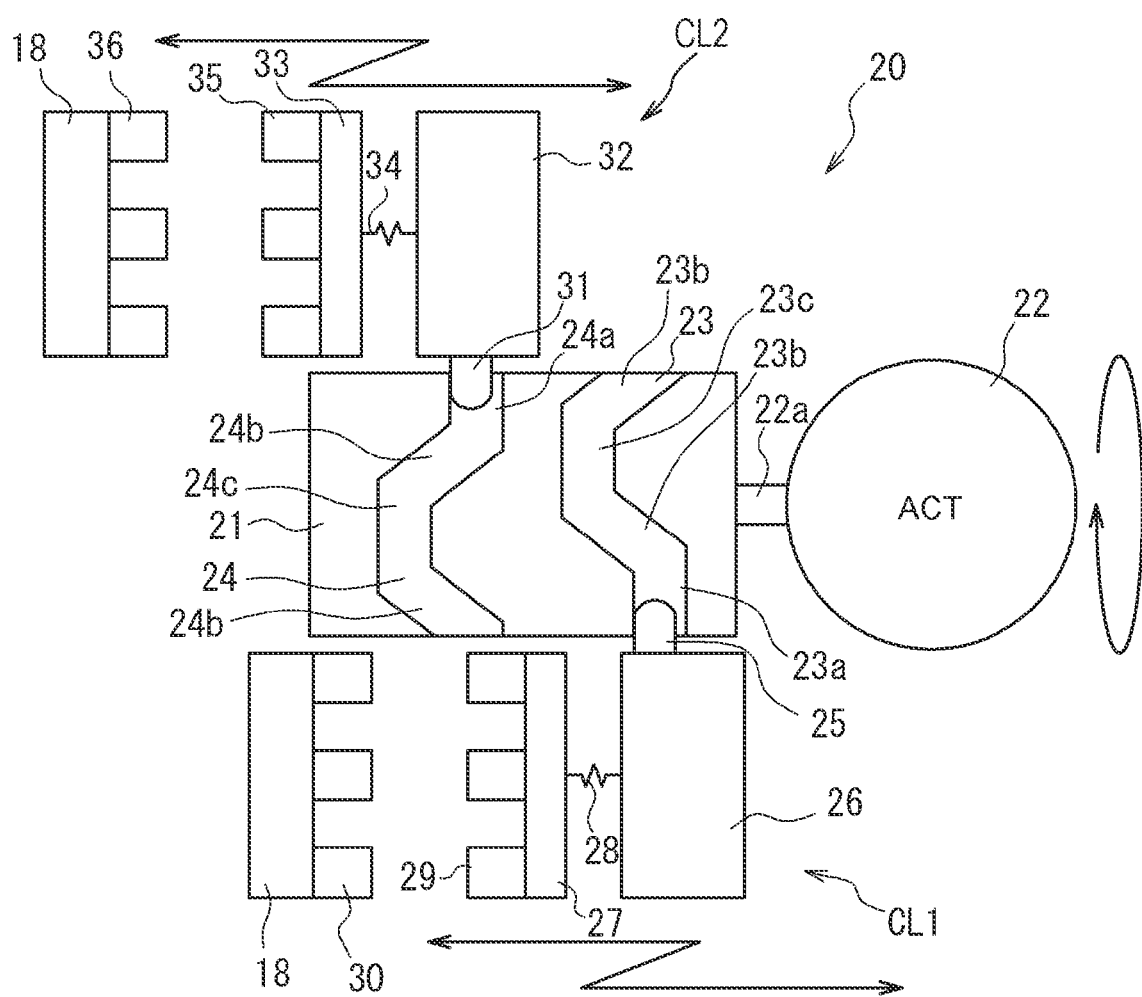
FIG. 2 is a schematic diagram for describing an example of an operation mechanism configured to switch an engaged state and a disengaged state of each clutch mechanism.

FIG. 2 is a schematic diagram for describing an example of an operation mechanism 20 that can be employed when the clutch mechanisms CL1 and CL2 are dog clutch mechanisms. The operation mechanism 20 switches an engaged state and a disengaged state of each of the engagement mechanisms CL1 and CL2. The operation mechanism 20 includes a cylindrical shift drum 21 and an actuator 22. The shift drum 21 is an example of a "guide member" according to the embodiment of the present disclosure. The actuator 22 rotates the shift drum 21.

The shift drum 21 may be similar to a cylindrical cam known as related art. In the example illustrated in FIG. 2, the shift drum 21 has cam grooves 23 and 24 on its outer peripheral surface. Specifically, the first cam groove 23 is formed along a circumferential direction on one side of the shift drum 21 in its axial direction, and the second cam groove 24 is formed along the circumferential direction on the other side of the shift drum 21 in its axial direction. The cam grooves 23 and 24 are shaped to meander in the axial direction of the shift drum 21. The cam grooves 23 and 24 include disengaging portions 23*a* and 24*a*, actuating portions 23*b* and 24*b*, and engaging portions 23*c* and 24*c*, respectively. The disengaging portions 23*a* and 24*a* are provided on one side in the axial direction of the shift drum 21 relative to the engaging portions 23*c* and 24*c*. The actuating portions 23*b* and 24*b* are communicated with the disengaging portions 23*a* and 24*a*, respectively, and are inclined with respect to the axial direction of the shift drum 21 to the other side in the axial direction. The engaging portions 23*c* and 24*c* are communicated with the actuating portions 23*b* and 24*b*, and are provided on the other side of the shift drum 21 relative to the disengaging portions 23*a* and 24*a*, respectively.

An output shaft 22*a* of the actuator 22 is coupled to the shift drum 21. The actuator 22 controls a rotation angle of the shift drum 21. The actuator 22 may be a motor configured to control the rotation angle as appropriate, such as a stepper motor or a servomotor. A speed reducing mechanism or the like may be provided between the actuator 22 and the shift drum 21 to increase an output torque of the actuator 22.

A first operation pin 25 serving as a cam follower engages with the first cam groove 23. A first movable member 26 is coupled to the first operation pin 25. The first movable member 26 is movable in the axial direction together with the first operation pin 25. The first movable member 26 engages the first clutch mechanism CL1 by pressing the first clutch mechanism CL1. In the example illustrated in FIG. 2, a hub 27 is coupled to the first movable member 26 via a spring 28. The hub 27 rotates together with the input shaft 14. The first movable member 26 and the hub 27 are rotatable relative to each other.

Dog teeth 29 are provided on an end face of the hub 27 that is on the opposite side of the hub 27 from a pressure receiving face to be pressed by the spring 28. In the example illustrated in FIG. 2, the carrier 18 is arranged to face the end face of the hub 27 where the dog teeth 29 are provided, and dog teeth 30 that mesh with the dog teeth 29 are formed on a face of the carrier 18 that faces the hub 27. By rotating the shift drum 21, that is, moving the shift drum 21 relative to the first movable member 26, the first movable member 26 moves to an engaging position where the dog teeth 29 and 30 mesh with each other, or moves to a disengaging position where the dog teeth 29 and 30 are unmeshed from each other. By meshing the dog teeth 29 and 30 as described above, the input shaft 14 and the carrier 18 engage with each other to rotate together. The spring 28 is provided to reduce an excessive load that may be applied to the dog teeth 29 and 30 or the first operation pin 25 due to compression when the phases of the dog teeth 29 and 30 are matched and their tips come into contact with each other.

Similarly, a second operation pin 31 serving as a cam follower engages with the second cam groove 24. A second movable member 32 is coupled to the second operation pin 31. The second movable member 32 is movable in the axial direction together with the second operation pin 31. The second movable member 32 engages the second clutch mechanism CL2 by pressing the second clutch mechanism CL2. In the example illustrated in FIG. 2, a rotational member 33 is coupled to the second movable member 32 via a spring 34 to rotate together with the ring gear 16. The second movable member 32 and the rotational member 33 are rotatable relative to each other.

Dog teeth 35 are provided on an end face of the rotational member 33 that is on the opposite side of the rotational member 33 from a pressure receiving face to be pressed by the spring 34. In the example illustrated in FIG. 2, the carrier 18 is arranged to face the end face of the rotational member 33 where the dog teeth 35 are provided, and dog teeth 36 that mesh with the dog teeth 35 are formed on a face of the carrier 18 that faces the rotational member 33. By rotating the shift drum 21, that is, moving the shift drum 21 relative to the second movable member 32, the second movable member 32 moves to an engaging position where the dog teeth 35 and 36 mesh with each other, or moves to a disengaging position where the dog teeth 35 and 36 are unmeshed from each other. By meshing the dog teeth 35 and 36 as described above, the ring gear 16 and the carrier 18 engage with each other to rotate together. The spring 34 is provided to reduce an excessive load that may be applied to the dog teeth 35 and 36 or the second operation pin 31 due to compression when the phases of the dog teeth 35 and 36 are matched and their tips come into contact with each other.

By engaging at least one of the first clutch mechanism CL1 and the second clutch mechanism CL2, the engine 1 and the output gear 19 are coupled together via the power split device 6 such that a torque is transmissible between the engine 1 and the output gear 19. The torque is transmitted from the output gear 19 to the front wheels 5R and 5L via a gear train. In the example illustrated in FIG. 1, a countershaft 37 is arranged in parallel to a rotation central axis of the engine 1, the splitting unit 7, or the gear shifting unit 8. A driven gear 38 meshing with the output gear 19 is attached to the countershaft 37. A driving gear 39 is also attached to the countershaft 37. The driving gear 39 meshes with a ring gear 41 of a differential gear unit 40 serving as a final speed reducer. In the example illustrated in FIG. 1, a parking lock mechanism P is provided to prohibit rotation of the driven gear 38, that is, rotation of the front wheels 5R and 5L.

A driving gear 42 meshes with the driven gear 38. The driving gear 42 is attached to a rotor shaft 3a of the second motor 3. Thus, power or torque output from the second motor 3 is added, at the driven gear 38, to the power or torque output from the output gear 19. The combined power or torque is output from the differential gear unit 40 to right and left drive shafts 43, and is transmitted to the front wheels 5R and 5L. For example, the second motor 3 may be coupled to the driving gear 39 such that a torque is transmissible between the second motor 3 and the driving gear 39, and may be configured to change the torque of the driving gear 39. The gear to which the second motor 3 is coupled is an example of a "rotational member" according to the embodiment of the present disclosure.

In the example illustrated in FIG. 1, a one-way clutch F is provided to hold the output shaft 13 or the input shaft 14 such that a driving torque output from the first motor 2 can be transmitted to the front wheels 5R and 5L. The one-way clutch F prohibits rotation of the output shaft 13 or the input shaft 14 in a direction opposite to the direction in which the output shaft 13 or the input shaft 14 rotates during the driving of the engine 1.

When the first motor 2 outputs the driving torque and the one-way clutch F is engaged, the one-way clutch F generates a reaction torque to the driving torque of the first motor 2. As a result, the driving torque of the first motor 2 is transmitted from the first motor 2 to the ring gear 16. That is, when the one-way clutch F locks the output shaft 13 or the input shaft 14, the carrier 12 of the splitting unit 7 or the carrier 18 of the gear shifting unit 8 can function as a reaction element, and the sun gear 9 of the splitting unit 7 can function as an input element.

The one-way clutch F generates the reaction torque when the first motor 2 outputs the driving torque. Therefore, a friction brake mechanism may be used to generate a torque for restricting the rotation of the output shaft 13 or the input shaft 14. In this case, the output shaft 13 or the input shaft 14 need not be held completely, but a requested reaction torque may be applied to the output shaft 13 or the input shaft 14 while permitting relative rotation.

Figure 3:
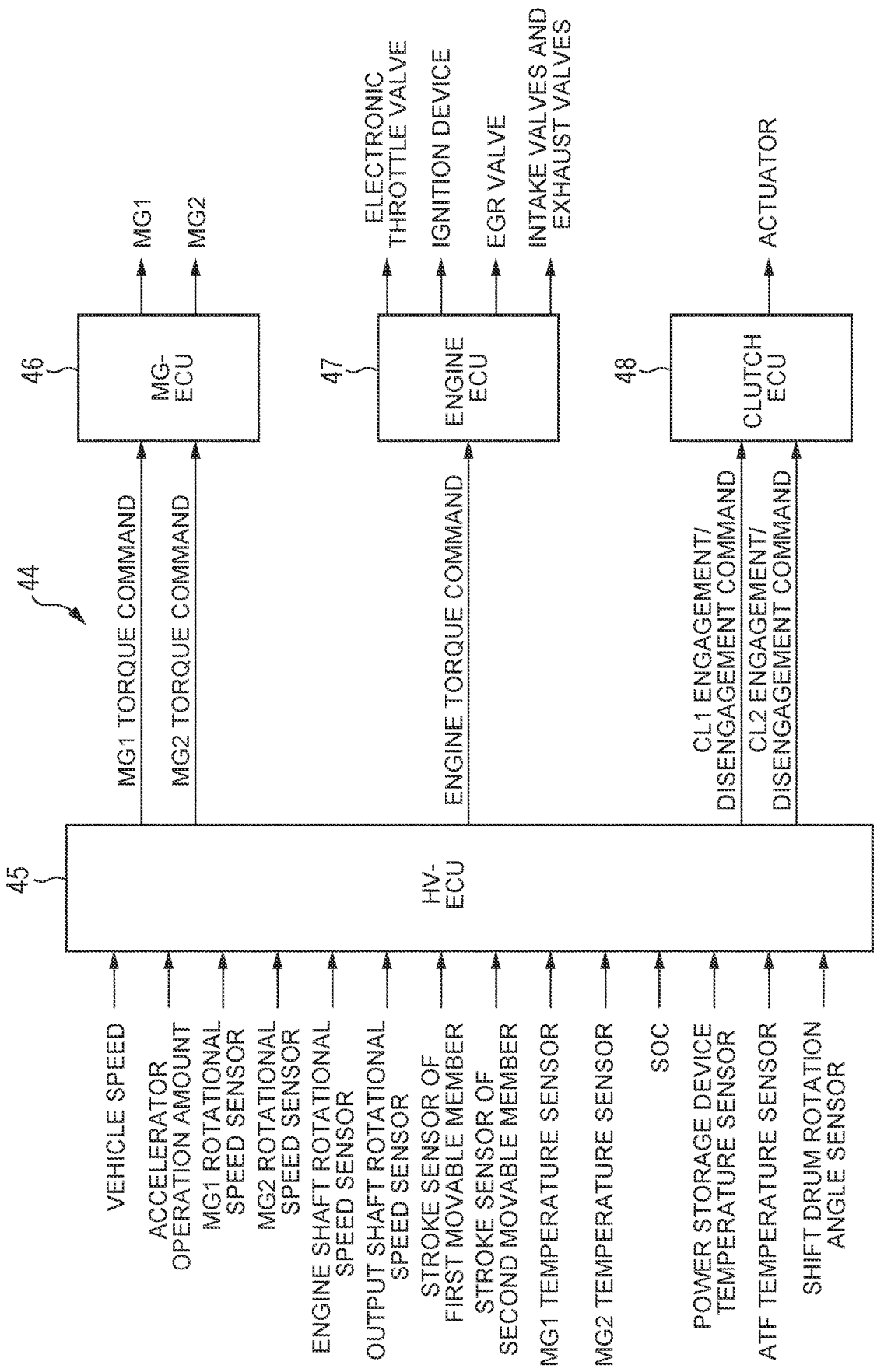
FIG. 3 is a block diagram for describing the configuration of an electronic control unit (ECU)

An electronic control unit (ECU) 44 is provided to control the engine 1, the motors 2 and 3, and the actuator 22. The ECU 44 is an example of a "controller" according to the embodiment of the present disclosure. The ECU 44 is mainly a microcomputer. FIG. 3 is a block diagram for describing an example of the configuration of the ECU 44. In the example illustrated in FIG. 3, the ECU 44 is constituted by a hybrid vehicle (HV)-ECU 45, an MG-ECU 46, an engine ECU 47, and a clutch ECU 48.

Data is input to the HV-ECU 45 from various sensors mounted on the vehicle Ve. The HV-ECU 45 outputs command signals to the MG-ECU 46, the engine ECU 47, and the clutch ECU 48 based on the input data and prestored maps and arithmetic expressions. FIG. 3 illustrates examples of the data input to the HV-ECU 45. The HV-ECU 45 receives data on a vehicle speed, an accelerator operation amount, a rotational speed of the first motor (MG1) 2, a rotational speed of the second motor (MG2) 3, a rotational speed of the output shaft 13 of the engine 1 (engine speed), an output rotational speed, which is a rotational speed of the ring gear 16 of the gear shifting unit 8 or the countershaft 37, a stroke amount of the first movable member 26, a stroke amount of the second movable member 32, a temperature of the first motor 2, a temperature of the second motor 3, a state of charge (SOC) of a power storage device (not illustrated), a temperature of the power storage device, a temperature of oil (ATF) for lubricating the gear train or the like, and a rotation angle of the shift drum 21.

An output torque of the first motor 2 and an output torque of the second motor 3 are determined based on, for example, the data input to the HV-ECU 45, and the determined data is output to the MG-ECU 46 as a command signal. Similarly, an output torque of the engine 1 is determined based on, for example, the data input to the HV-ECU 45, and the determined data is output to the engine ECU 47 as a command signal. Determination is made whether to engage or disengage the first clutch mechanism CL1 and the second clutch mechanism CL2 based on, for example, the data input to the HV-ECU 45, and a command signal for engagement or disengagement obtained as a result of the determination is output to the clutch ECU 48.

The MG-ECU 46 determines values of currents to be supplied to the motors 2 and 3 based on the data input from the HV-ECU 45, and outputs command signals to the motors 2 and 3. Since the motors 2 and 3 are AC motors, each command signal contains, for example, a frequency of a current to be generated by an inverter and a value of a voltage to be boosted by a converter.

Based on the data input from the HV-ECU 45, the engine ECU 47 determines values of a current for setting an opening degree of an electronic throttle valve, a current for igniting fuel by an ignition device, a current for setting an opening degree of an exhaust gas recirculation (EGR) valve, and currents for setting opening degrees of intake valves and exhaust valves, and outputs command signals to the valves and the device. That is, the engine ECU 47 outputs command signals for controlling the engine torque to the devices that control the output torque of the engine 1.

Based on the signal for engagement or disengagement of the clutch mechanisms CL1 and CL2 from the HV-ECU 45, the clutch ECU 48 determines a rotation angle of the actuator 22 to achieve the engagement or disengagement, and outputs a command signal to the actuator 22 to obtain the rotation angle. The ECU 44 need not be a single ECU that centralizes overall control, but individual ECUs may be provided for the engine 1, the motors 2 and 3, and the actuator 22.

The drive device 4 can set an HV driving mode and an electric vehicle (EV) driving mode. In the HV driving mode, the vehicle Ve travels by outputting a driving torque from the engine 1. In the EV driving mode, the vehicle Ve travels by outputting a driving torque from the first motor 2 or the second motor 3 without outputting the driving torque from the engine 1. As the HV driving mode, an HV-Low mode, an HV-High mode, and a direct mode (fixed mode) can be set. In the HV-Low mode, when the engine 1 outputs a predetermined torque, a torque transmitted to the ring gear 16 of the gear shifting unit 8 (or the output gear 19) is relatively large. In the HV-High mode, the transmitted torque is relatively small. In the direct mode, the torque of the engine 1 is transmitted to the ring gear 16 of the gear shifting unit 8 without being changed.

As the EV driving mode, a dual-motor mode and a single-motor mode (disconnected mode) can be set. In the dual-motor mode, the first motor 2 and the second motor 3 output driving torques. In the single-motor mode, only the second motor 3 outputs the driving torque without outputting the driving torque from the first motor 2. As the dual-motor mode, an EV-Low mode and an EV-High mode can be set. In the EV-Low mode, the increase rate of the torque output from the first motor 2 is relatively high. In the EV-High mode, the increase rate of the torque output from the first motor 2 is lower than that in the EV-Low mode. In the single-motor mode, the vehicle Ve can travel by outputting the driving torque only from the second motor 3 while the first clutch mechanism CL1 is engaged, by outputting the driving torque only from the second motor 3 while the second clutch mechanism CL2 is engaged, or by outputting the driving torque only from the second motor 3 while the clutch mechanisms CL1 and CL2 are disengaged.

Each driving mode is set by controlling the engine 1, the motors 2 and 3, and the clutch mechanisms CL1 and CL2. FIG. 4 is a diagram illustrating an example of the driving modes and whether the first clutch mechanism CL1, the second clutch mechanism CL2, and the one-way clutch F are engaged or disengaged, operating conditions of the first motor 2 and the second motor 3, and whether the driving torque is output from the engine 1 in the respective driving modes. In FIG. 4, a symbol "●" represents an engaged state, a symbol "—" represents a disengaged state, a symbol "G" represents an operation performed mainly as a generator, a symbol "M" represents an operation performed mainly as a motor, a blank field represents a state in which the first motor 2 or the second motor 3 functions as neither a motor nor a generator or is not involved in driving, a symbol "ON" represents a state in which the engine 1 outputs the driving torque, and a symbol "OFF" represents a state in which the engine 1 does not output the driving torque.

Figure 5:
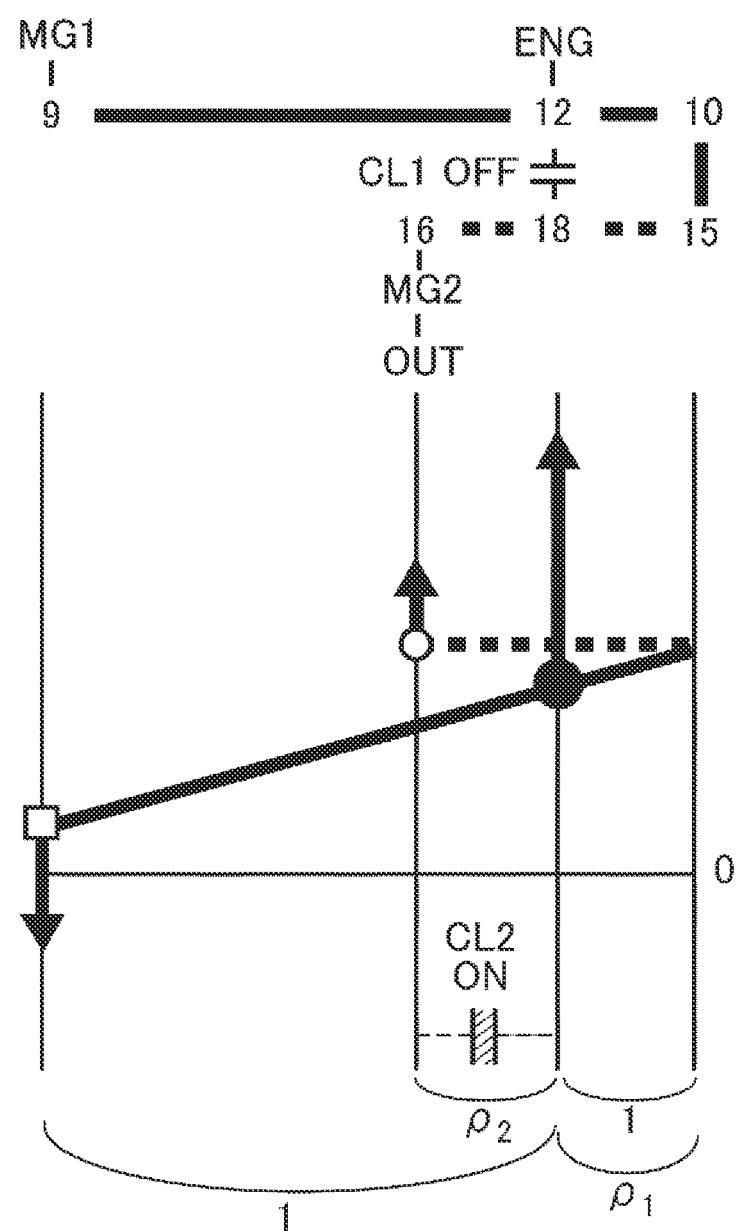
FIG. 5 is a nomograph for describing operating conditions in an HV-High mode.
Figure 6:
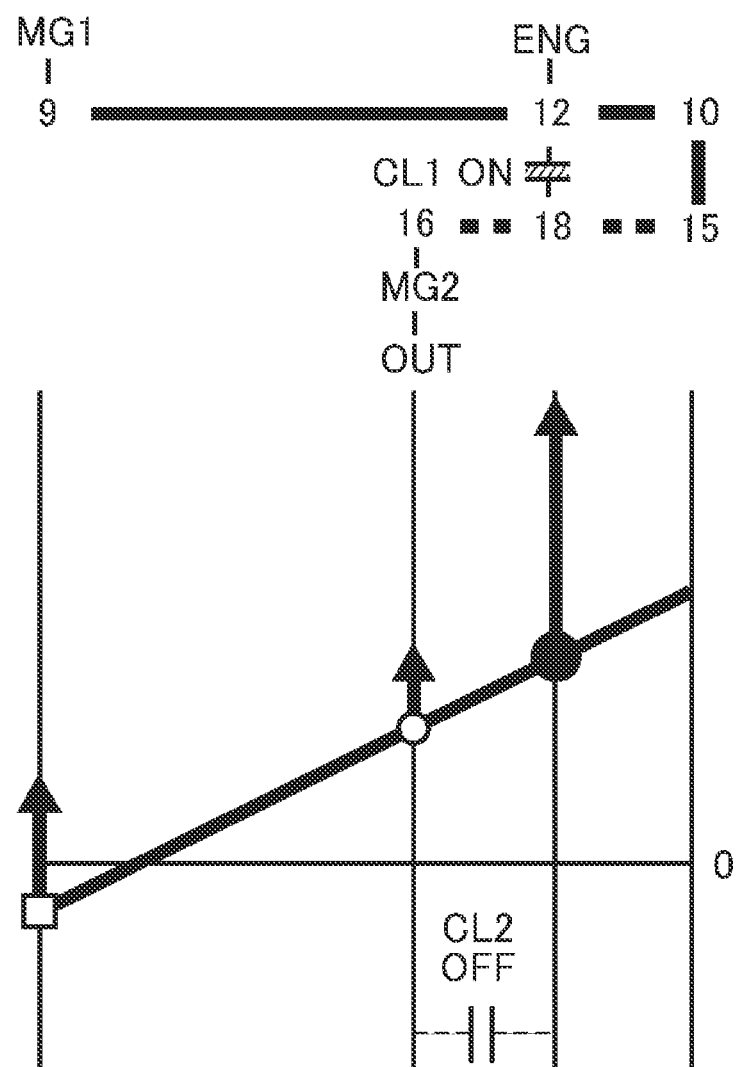
FIG. 6 is a nomograph for describing operating conditions in an HV-Low mode.
Figure 7:
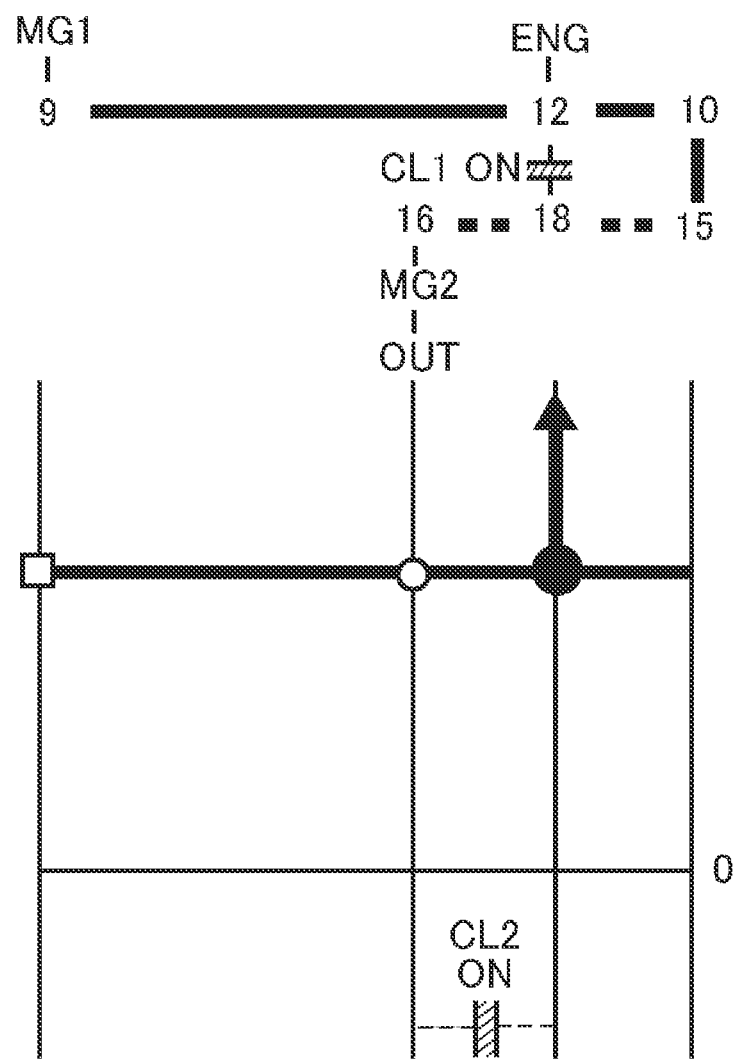
FIG. 7 is a nomograph for describing operating conditions in a direct mode.

FIG. 5 to FIG. 7 are nomographs for describing rotational speeds of the rotational elements of the power split device 6 and directions of torques of the engine 1 and the motors 2 and 3 when the HV-High mode, the HV-Low mode, and the direct mode are set, respectively. In each nomograph, parallel straight lines representing the rotational elements of the power split device 6 are drawn with intervals corresponding to gear ratios, and distances from a basic line orthogonal to the straight lines show the rotational speeds of the rotational elements. Arrows on the straight lines representing the rotational elements show the directions of the torques, and the lengths of the arrows show the magnitudes of the torques.

In the HV-High mode illustrated in FIG. 5, the engine 1 outputs a driving torque, the second clutch mechanism CL2 is engaged, and the first motor 2 outputs a reaction torque. In the HV-Low mode illustrated in FIG. 6, the engine 1 outputs a driving torque, the first clutch mechanism CL1 is engaged, and the first motor 2 outputs a reaction torque.

The magnitude of the reaction torque of the first motor 2 that can keep the engine speed and the rotational speed of the first motor 2 and the magnitude of the torque to be transmitted from the engine 1 to the ring gear 16 differ between the HV-High mode and the HV-Low mode. Specifically, when the output torque of the engine 1 is represented by Te, the magnitude of the requested reaction torque of the first motor 2 in the HV-Low mode is $(\rho_1 \cdot \rho_2/(1-\rho_1 \cdot \rho_2))$Te, and the magnitude of the torque to be transmitted to the ring gear 16 in the HV-Low mode is $(1/(1-\rho_1 \cdot \rho_2))$Te. The magnitude of the requested reaction torque of the first motor 2 in the HV-High mode is $(\rho_1/(1+\rho_1))$Te, and the magnitude of the torque to be transmitted to the ring gear 16 in the HV-High mode is $(1/(1+\rho_1))$Te. That is, the increase rate of the torque to be transmitted from the engine 1 to the ring gear 16 (or the front wheels 5R and 5L) differs between the HV-High mode and the HV-Low mode. In other words, the power split device 6 functions as a "power transmission mechanism" according to the embodiment of the present disclosure. In the expressions, "$\rho_1$" represents a gear ratio of the splitting unit 7 (ratio between the number of teeth of the ring gear 10 and the number of teeth of the sun gear 9), and "$\rho_2$" represents a gear ratio of the gear shifting unit 8 (ratio between the number of teeth of the ring gear 16 and the number of teeth of the sun gear 15). The values of $\rho_1$ and $\rho_2$ are smaller than "1".

When a torque larger than the reaction torque is output from the first motor 2, the increased amount of torque acts such that the engine speed decreases. When a torque smaller than the reaction torque is output from the first motor 2, a part of the engine torque acts such that the engine speed increases. That is, the engine speed can be controlled by controlling the torque of the first motor 2. In other words, the torque of the first motor 2 is controlled such that the engine speed reaches a target rotational speed. For example, the engine speed is controlled such that the fuel efficiency of the engine 1 is satisfactory, or such that the overall efficiency of the drive device 4 in consideration of the driving efficiency of the first motor 2 (value obtained by dividing a consumed energy amount by an energy amount of the front wheels 5R and 5L) is most satisfactory.

By outputting the reaction torque from the first motor 2 as described above, a part of the power of the engine 1 is converted into electric energy by the first motor 2 when the first motor 2 functions as a generator. Power obtained by subtracting the power converted into the electric energy by the first motor 2 from the power of the engine 1 is transmitted to the ring gear 16 of the gear shifting unit 8. The electric power obtained through the conversion by the first motor 2 may be supplied to the second motor 3 to drive the second motor 3, or may be supplied to the power storage device to increase the state of charge of the power storage device.

In the direct mode, the clutch mechanisms CL1 and CL2 are engaged, and the rotational elements of the power split device 6 rotate at the same rotational speed as illustrated in FIG. 7. That is, the power of the engine 1 is entirely output from the power split device 6. In other words, the power of the engine 1 is not partially converted into electric energy by the first motor 2 or the second motor 3. Thus, there is no loss such as a joule loss when the power is converted into the electric energy. Accordingly, the power transmission efficiency can be improved.

When the driving mode is set to the HV-Low mode or the HV-High mode and determination is made to switch the driving mode to the other one of the HV-Low mode and the HV-High mode because the requested driving force or the vehicle speed is changed, the driving mode is temporarily set to the direct mode and then switched to the other one of the HV-Low mode and the HV-High mode in principle. In other words, a clutch mechanism disengaged at the time of determination to switch the driving mode is engaged, and then a clutch mechanism engaged at the time of determination to switch the driving mode is disengaged. Alternatively, an engaged clutch mechanism is disengaged, and then a clutch mechanism associated with the driving mode to be set is engaged. That is, the HV-Low mode and the HV-High mode are switched via the fixed mode or the disconnected mode. As illustrated in FIG. 4, the HV-Low mode and the EV-Low mode differ from each other in terms of the operating conditions of the engine 1 and the first motor 2, but are identical to each other as to whether the first clutch mechanism CL1 and the second clutch mechanism CL2 are engaged or disengaged. The same applies to the HV-High mode and the EV-High mode.

Thus, the drive device 4 illustrated in FIG. 1 switches the driving modes in order of the HV-High mode, the direct mode, the HV-Low mode, the EV-Low mode, the disconnected mode, the EV-High mode, and the HV-High mode, or in reverse order. That is, the conditions of the first clutch mechanism CL1 and the second clutch mechanism CL2 are changed in order of a state in which only the second clutch mechanism CL2 is engaged, a state in which the first clutch mechanism CL1 and the second clutch mechanism CL2 are engaged, a state in which only the first clutch mechanism CL1 is engaged, and a state in which the first clutch mechanism CL1 and the second clutch mechanism CL2 are disengaged, or in reverse order.

Figure 8:
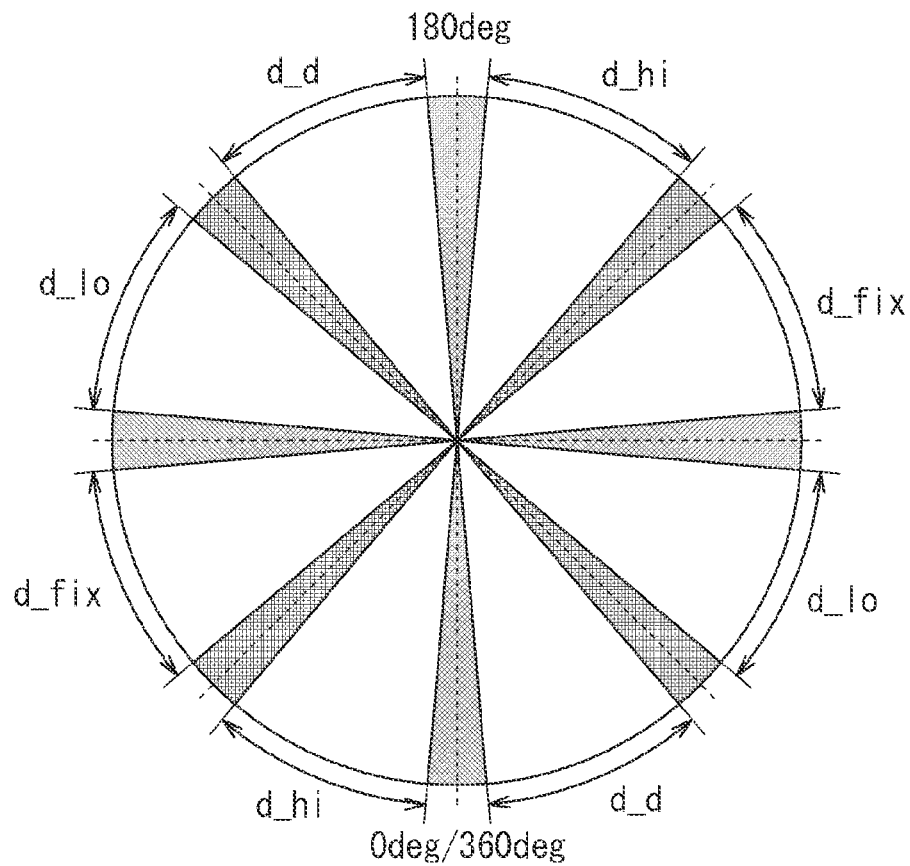
FIG. 8 is a diagram illustrating the driving modes to be set depending on a rotation angle of a shift drum.
Figure 9:
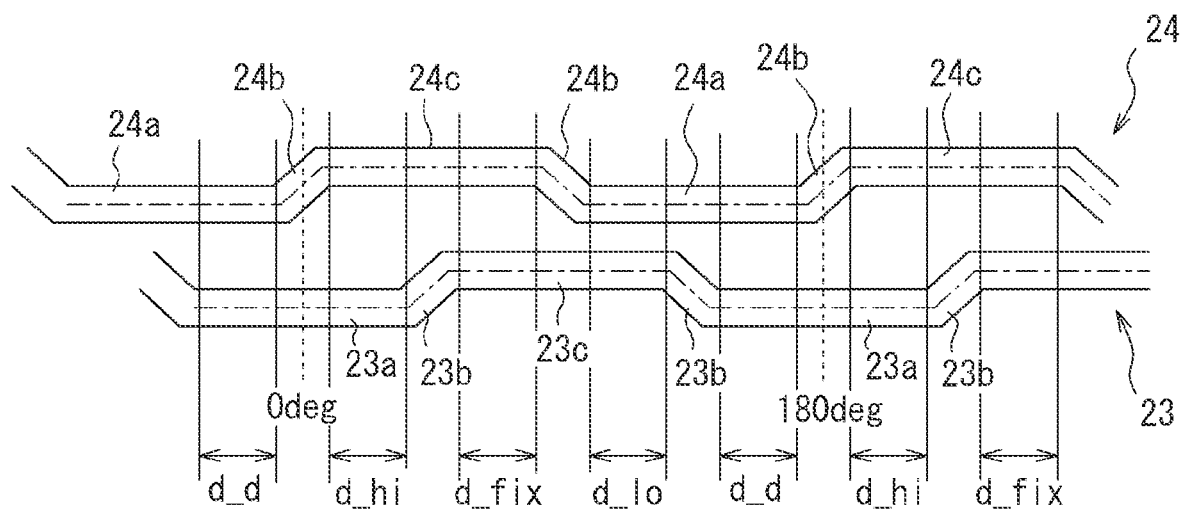
FIG. 9 is a development of the shift drum in a plan view.

When the operation pins 25 and 31 move in the circumferential direction along the respective cam grooves 23 and 24 by rotating the shift drum 21 or the actuator 22, the clutch mechanisms CL1 and CL2 are driven in the order described above depending on the rotation angle of the shift drum 21. FIG. 8 and FIG. 9 are diagrams for describing the shapes of the cam grooves 23 and 24. FIG. 8 is a diagram illustrating the driving modes to be set depending on the rotation angle of the shift drum 21. FIG. 9 is a development of the shift drum 21 in a plan view. In FIG. 9, the rotation angle of the shift drum 21 is shown in a lateral direction on the drawing sheet, and positions in the axial direction of the shift drum 21 are shown in a vertical direction on the drawing sheet. That is, an upper part of the first cam groove 23 corresponds to the engaging portion 23c, and an upper part of the second cam groove 24 corresponds to the engaging portion 24c.

In the example illustrated in FIG. 8 and FIG. 9, the first engagement mechanism CL1 is disengaged and the second engagement mechanism CL2 is engaged in a High area d_hi starting from a position where the rotation angle of the shift drum 21 advances by a predetermined angle from a reference rotation angle (this rotation angle is hereinafter defined as 0 degrees). That is, the EV-High mode or the HV-High mode (hereinafter referred to collectively as a High mode) is set. An axial position of the first movable member 26 in the High area d_hi is an example of a "disengaging position" according to the embodiment of the present disclosure, and an axial position of the second movable member 32 in the High area d_hi is an example of an "engaging position" according to the embodiment of the present disclosure. The first engagement mechanism CL1 and the second engagement mechanism CL2 are engaged in a Fix area d_fix starting from a position where the rotation angle of the shift drum 21 further advances by the predetermined angle from the High area d_hi. That is, the direct mode is set. An axial position of the first movable member 26 in the Fix area d_fix is an example of an "engaging position" according to the embodiment of the present disclosure. A portion between the High area d_hi and the Fix area d_fix (actuating portion 23b) is an actuating area where the first engagement mechanism CL1 is switched from the disengaged state to the engaged state.

The first engagement mechanism CL1 is engaged and the second engagement mechanism CL2 is disengaged in a Low area d_lo starting from a position where the rotation angle of the shift drum 21 advances by the predetermined angle from the Fix area d_fix. That is, the EV-Low mode or the HV-Low mode (hereinafter referred to collectively as a Low mode) is set. A position of the second movable member 32 in the Low area d_lo is an example of a "disengaging position" according to the embodiment of the present disclosure. A portion between the Fix area d_fix and the Low area d_lo (24b) is an actuating area where the second engagement mechanism CL2 is switched from the engaged state to the disengaged state.

The first engagement mechanism CL1 and the second engagement mechanism CL2 are disengaged in a D area d_d starting from a position where the rotation angle of the shift drum 21 advances by the predetermined angle from the Low area d_lo. That is, the disconnected mode is set. A portion between the Low area d_lo and the D area d_d (23b) is an actuating area where the first engagement mechanism CL1 is switched from the engaged state to the disengaged state.

In the operation mechanism 20 using the shift drum 21 having the cam grooves 23 and 24 described above, when one driving mode (for example, the Low mode) is set for a long period because a steady-driving period is long, areas of the cam grooves 23 and 24 associated with the driving mode that is set for a long period are more likely to be worn out than the other areas. In the shift drum 21 illustrated in FIG. 8 and FIG. 9, a guide area associated with the driving modes that can be set by the power split device 6, including the High mode, the direct mode, the Low mode, and the disconnected mode (that is, increase rates of torques), can be set within a range of 180 degrees in terms of the rotation angle of the shift drum 21. That is, the shift drum 21 has two guide areas for setting the High mode, the direct mode, the Low mode, and the disconnected mode. The two guide areas are provided in a continuous manner such that the High area d_hi comes at a rotation angle advanced by the predetermined angle from the D area d_d. That is, a portion between the D area d_d and the High area d_hi is an actuating area where the second engagement mechanism CL2 is switched from the disengaged state to the engaged state. The "guide member" according to the embodiment of the present disclosure is not limited to the member having two guide areas, but may have three or more guide areas.

Figure 10:
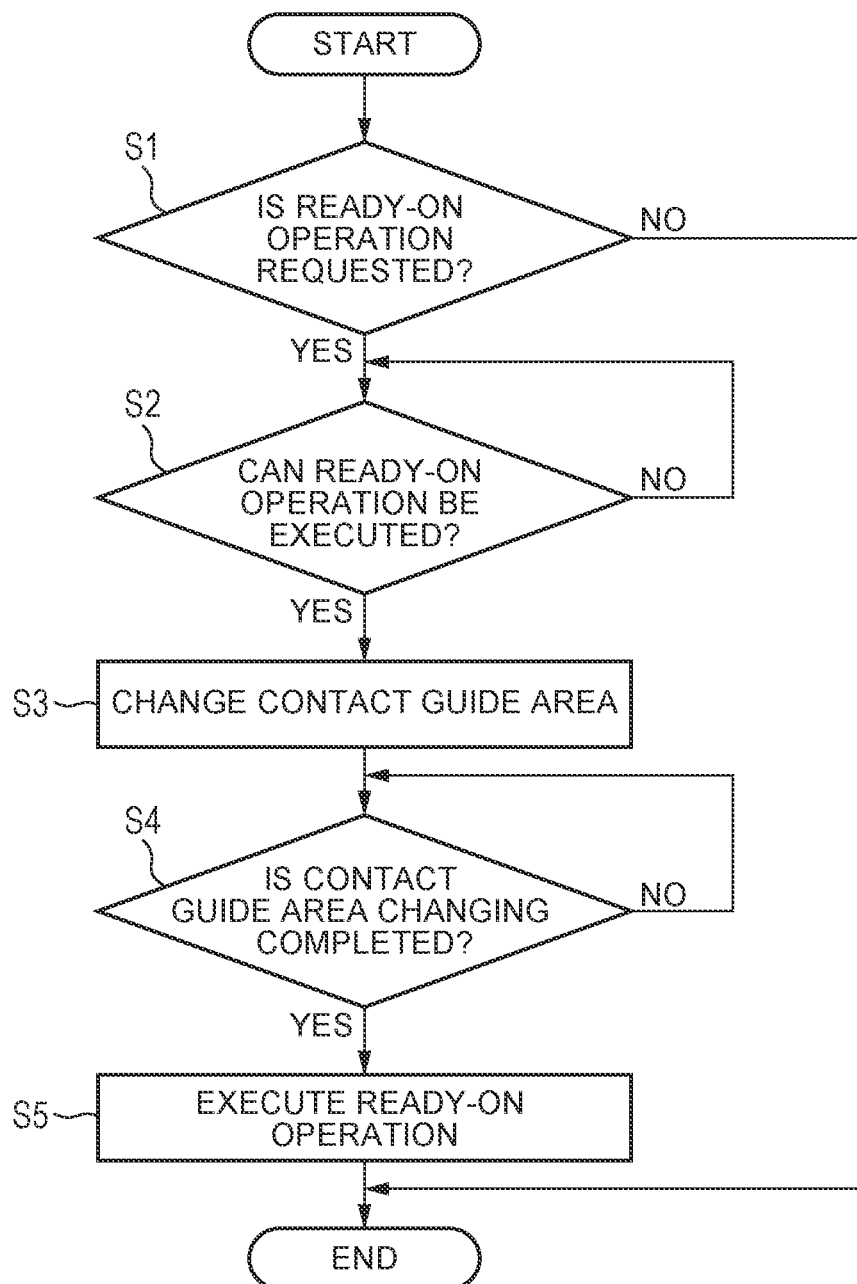
FIG. 10 is a flowchart for describing a control example in which the contact guide area is switched in response to a request for a ready-ON operation.

A control device for the power transmission mechanism according to the embodiment of the present disclosure uses the shift drum 21 having the structure described above. The control device is configured such that, when a predetermined condition is satisfied, the guide area where the operation pins 25 and 31 are in contact with the cam grooves 23 and 24, that is, the contact guide area of the cam grooves 23 and 24 is switched from one guide area (first guide area) to the other guide area (second guide area). FIG. 10 is a flowchart for describing an example of the control. In the control example illustrated in FIG. 10, the contact guide area is switched under a condition that a request is made to switch an untravelable state (ready-OFF) to a travelable state (ready-ON). Specifically, determination is first made whether a ready-ON operation is requested (Step S1). The determination in Step S1 can be made based on whether a driver operates, for example, a power button or a ready-ON/OFF switch provided in the vehicle Ve.

When the result of the determination in Step S1 is "No" because the ready-ON operation is not requested, this routine is terminated temporarily. When the result of the determination in Step S1 is "Yes" because the ready-ON operation is requested, determination is made whether the ready-ON operation can be executed (Step S2). The determination in Step S2 can be made based on, for example, whether the driver is operating a brake.

When the result of the determination in Step S2 is "No" because the ready-ON operation cannot be executed, Step S2 is repeated until the result of the determination in Step S2 turns into "Yes". In other words, the process waits until the ready-ON operation turns executable. When the result of the determination in Step S2 is "Yes" because the ready-ON operation can be executed, the contact guide area of the cam grooves 23 and 24 is changed (Step S3). In the example illustrated in FIG. 8 and FIG. 9, when the contact guide area at the time of a previous ready-OFF operation is the first guide area using the cam grooves 23 and 24 in a range from 0 degrees to 180 degrees in terms of the rotation angle of the shift drum 21, the first guide area is changed to the second guide area using the cam grooves 23 and 24 in a range from 180 degrees to 360 degrees. In this case, the same driving mode can be set before and after the contact guide area is changed. In the example illustrated in FIG. 8 and FIG. 9, the shift drum 21 can be rotated by 180 degrees. In the shift drum 21 illustrated in FIG. 8 and FIG. 9, a plurality of guide areas in ranges from 0 degrees to 180 degrees, from 45 degrees to 225 degrees, and from 90 degrees to 270 degrees in terms of the rotation angle of the shift drum 21 can be set as examples of the guide area where all the driving modes can be set. Thus, in Step S3, the contact guide area may be changed to include a part of the previous contact guide area. For example, the guide area may be switched to the guide area in the range from 45 degrees to 225 degrees.

Then, determination is made whether the contact guide area changing is completed (Step S4). When the result of the determination in Step S4 is "No" because the contact guide area changing is not completed, Step S4 is repeated until the contact guide area changing is completed. When the result of the determination in Step S4 is "Yes" because the contact guide area changing is completed, the ready-ON operation is executed (Step S5), and this routine is terminated temporarily.

Figure 11:
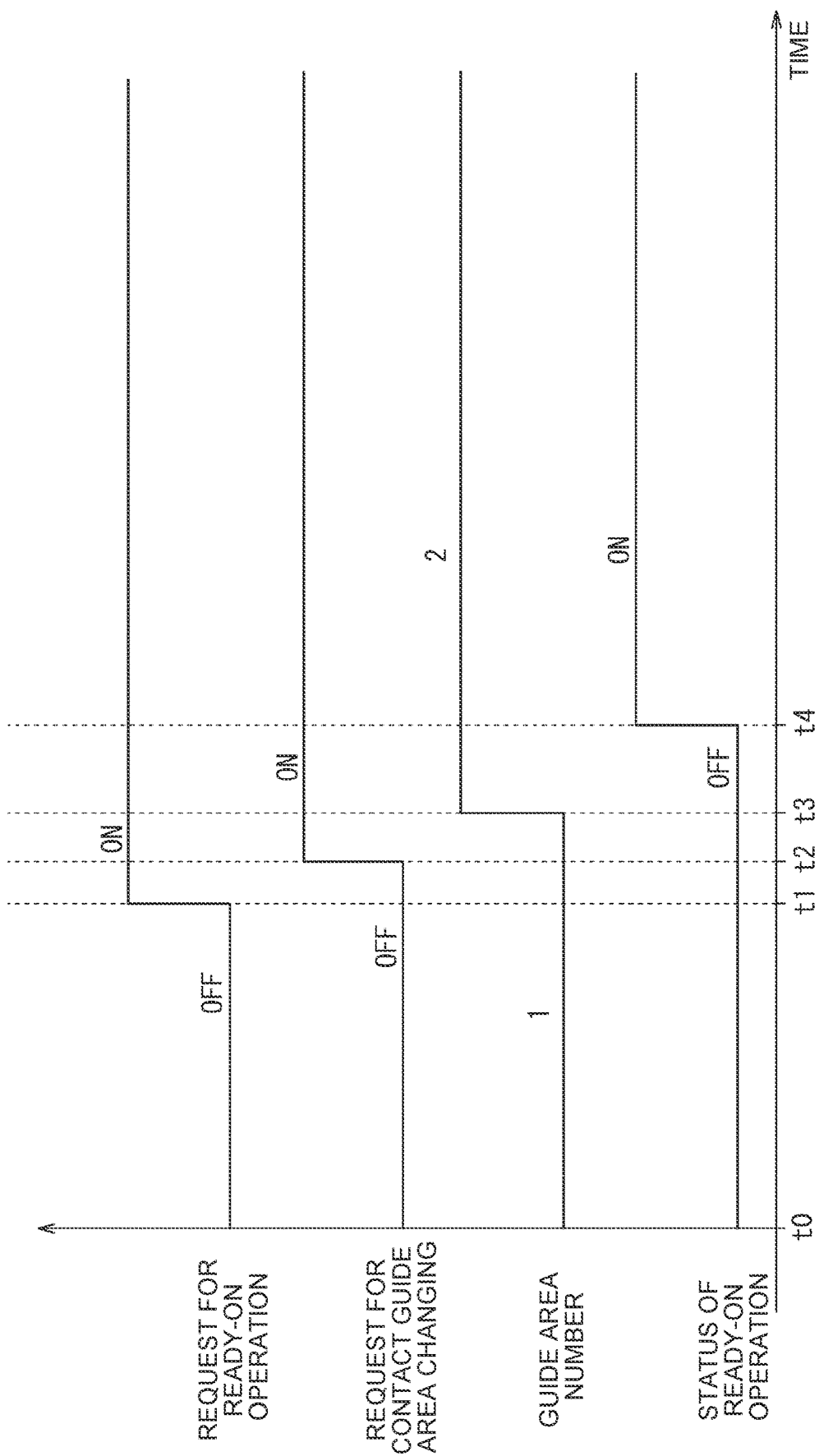
FIG. 11 is a time chart illustrating whether the ready-ON operation is requested, whether changing of the contact guide area is requested, and changes in a guide area number and a status of the ready-ON operation in the control example illustrated in FIG. 10.

FIG. 11 is a time chart for describing whether the ready-ON operation is requested, whether the contact guide area changing is requested, and changes in a guide area number and a status of the ready-ON operation in the control example described above. In the example illustrated in FIG. 11, a contact guide area at a time t0 is the first guide area, and the ready-ON operation is requested at a time t1. As a result, the condition that the ready-ON operation can be executed is satisfied, and therefore the contact guide area changing is requested at a time t2.

At the time t2, the actuator 22 rotates by 180 degrees by energizing the actuator 22. That is, the contact guide area is changed by controlling the actuator 22 such that the same driving mode as that before the request for the ready-ON operation is set. The contact guide area changing from the first guide area to the second guide area is completed at a time t3 after an elapse of a rotating period of the actuator 22. Therefore, the ready-ON operation is executed at a time t4 because the result of the determination in Step S4 is "Yes" in the control example described above.

As described above, the plurality of guide areas each associated with the driving modes is provided on the shift drum 21 and the contact guide area is switched every time the ready-ON operation is executed. Therefore, even if a certain driving mode is set frequently, sliding positions between the operation pin 25 and the cam groove 23 and between the operation pin 31 and the cam groove 24 can be dispersed, because the plurality of guide areas where this driving mode can be set is provided on the shift drum 21 and the contact guide area is switched every time the ready-ON operation is executed. As a result, it is possible to reduce the occurrence of a case where the cam grooves 23 and 24 are locally worn out. That is, a decrease in the durability of the shift drum 21 can be suppressed. In other words, the frequencies of sliding between the cam groove 23 and the operation pin 25 and between the cam groove 24 and the operation pin 31 can be reduced as compared to a case where the contact guide area is not changed. Therefore, it is possible to reduce the number of processes for reducing friction, such as surface treatment or machining on the sliding surfaces of the cam grooves 23 and 24, or to reduce the size of the shift drum 21. As a result, the weight of the drive device 4 can be reduced. Since the amounts of wear in the cam grooves 23 and 24 can be reduced, deviation of the position of the first movable member 26 or the second movable member 32 from an intended position can be suppressed. Thus, deviation of timing to switch the engaged state to the disengaged state or to switch the disengaged state to the engaged state can be suppressed in each of the first clutch mechanism CL1 and the second clutch mechanism CL2. That is, a decrease in controllability of the clutch mechanisms CL1 and CL2 can be suppressed.

The contact guide area is switched while the plurality of driving modes is set in sequence. The contact guide area is switched when the ready-ON operation is requested, that is, when the vehicle Ve is stopped. Even though the plurality of driving modes is set in the process of switching the contact guide area, the acceleration of the vehicle Ve does not change, for example. Thus, driver's discomfort can be suppressed.

Since the same driving mode is set before and after the contact guide area is changed, there is no need to change, for example, torque control for the first motor 2. Therefore, it is possible to suppress complication of control, and to keep continuity of operating conditions of devices other than the operation mechanism 20 (for example, the engine 1 and the first motor 2). When the shift drum 21 is formed such that the plurality of guide areas can be selected as the contact guide area while the shift drum 21 makes one turn, the distance between adjacent areas such as the Low area d_lo and the Fix area d_fix for setting the driving modes can be reduced. Thus, the time required to switch the driving modes can be reduced.

Figure 12:
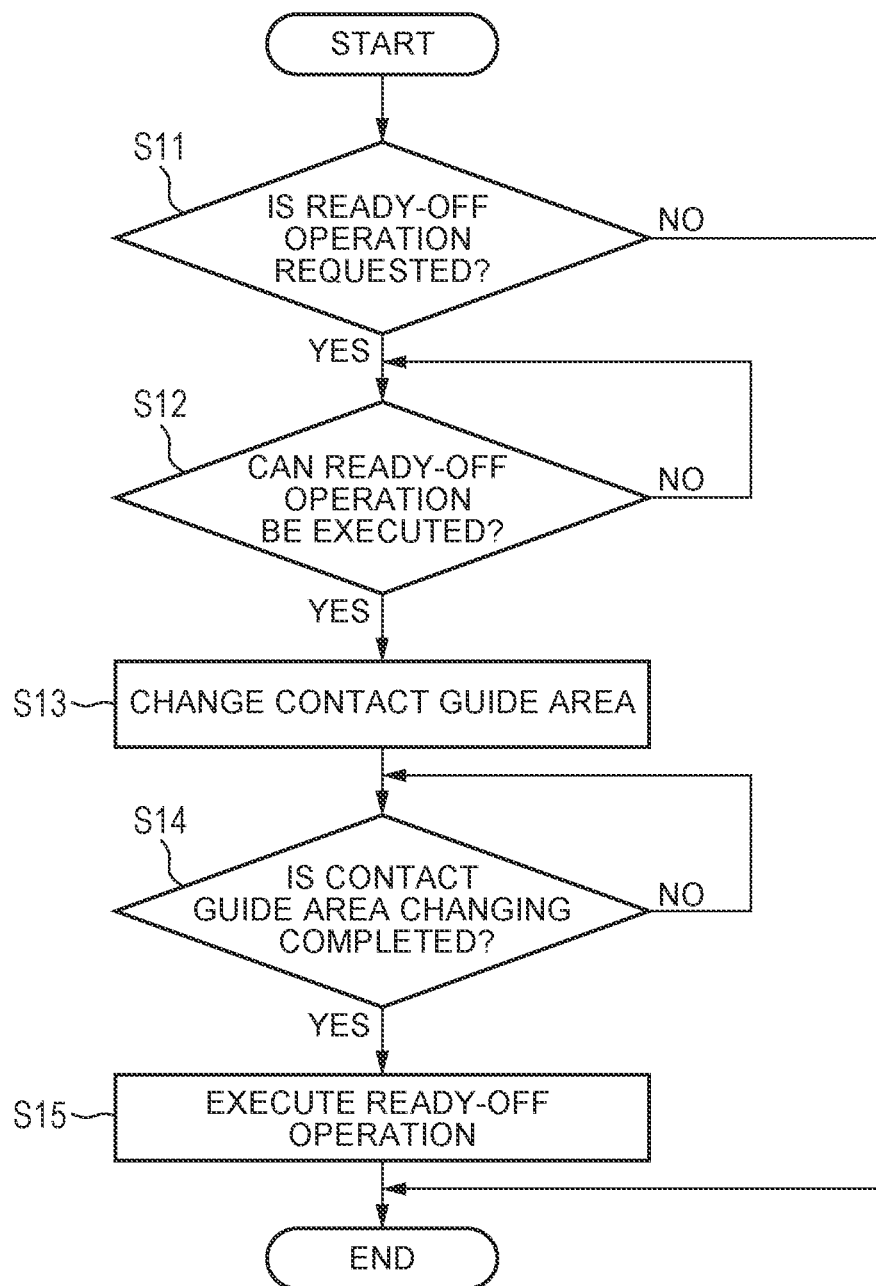
FIG. 12 is a flowchart for describing a control example in which the contact guide area is switched in response to a request for a ready-OFF operation.

FIG. 12 is a flowchart for describing another control example in which the contact guide area is switched while the vehicle Ve is being stopped. In the control example illustrated in FIG. 12, determination is first made whether a ready-OFF operation is requested (Step S11). The determination in Step S11 can be made based on whether the driver operates, for example, the power button or the ready-ON/OFF switch provided in the vehicle Ve.

When the result of the determination in Step S11 is "No" because the ready-OFF operation is not requested, this routine is terminated temporarily. When the result of the determination in Step S11 is "Yes" because the ready-OFF operation is requested, determination is made whether the ready-OFF operation can be executed (Step S12). The determination in Step S12 can be made based on, for example, whether the vehicle Ve is being stopped or is in a parking range.

When the result of the determination in Step S12 is "No" because the ready-OFF operation cannot be executed, Step S12 is repeated until the result of the determination in Step S12 turns into "Yes". In other words, the process waits until the ready-OFF operation turns executable. When the result of the determination in Step S12 is "Yes" because the ready-OFF operation can be executed, the guide area is changed (Step S13). Step S13 is similar to Step S3 of FIG. 10. Therefore, the guide area may be changed to the guide area using the cam grooves 23 and 24 in the range from 180 degrees to 360 degrees in terms of the rotation angle of the shift drum 21. Alternatively, the contact guide area may be changed such that a part of the previous guide area is used.

Then, determination is made whether the contact guide area changing is completed (Step S14). When the result of the determination in Step S14 is "No" because the contact guide area changing is not completed, Step S14 is repeated until the contact guide area changing is completed. When the result of the determination in Step S14 is "Yes" because the contact guide area changing is completed, the ready-OFF operation is executed (Step S15), and this routine is terminated temporarily.

Figure 13:
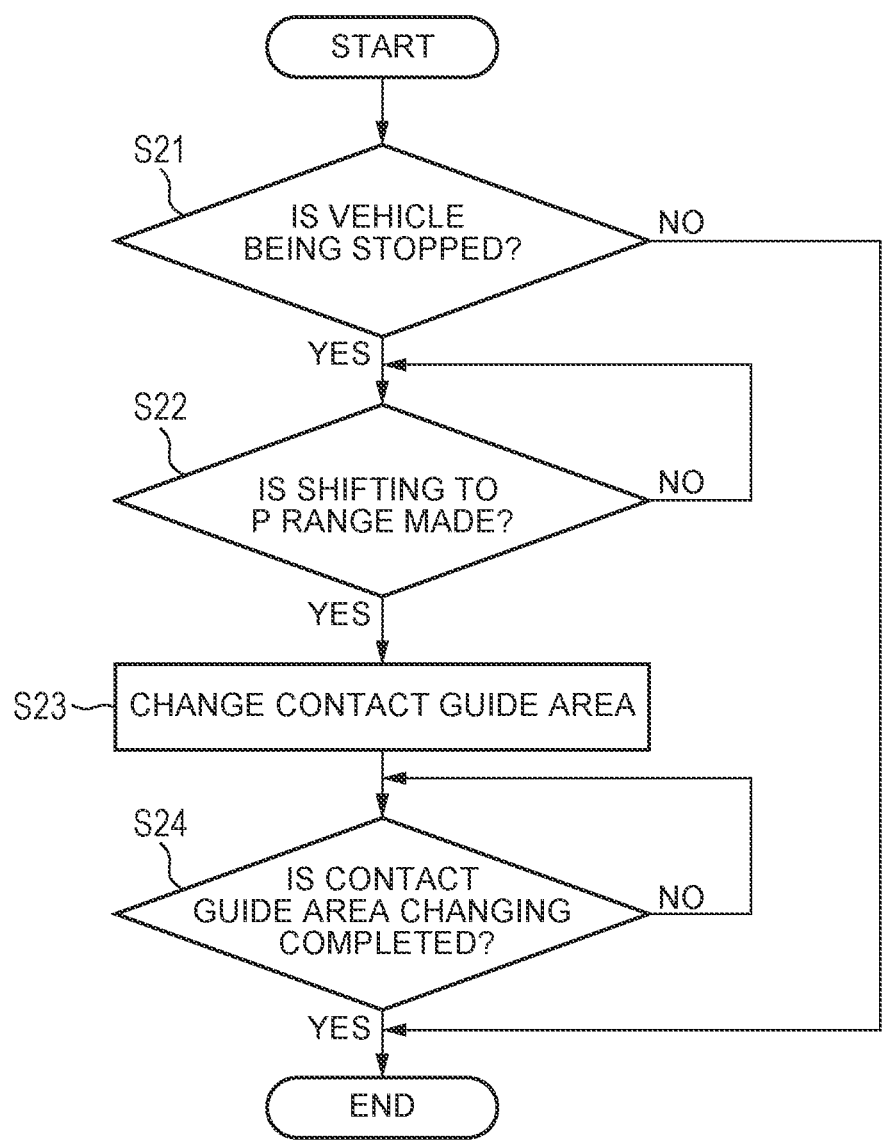
FIG. 13 is a flowchart for describing a control example in which the contact guide area is switched in response to a request to shift the vehicle into a parking range.

In the control examples illustrated in FIG. 10 and FIG. 12, the control guide area is changed when the ready-ON operation or the ready-OFF operation is set, that is, when the driver may get in or out of the vehicle Ve. When the shift drum 21 is rotated to change the contact guide area, at least one of the first clutch mechanism CL1 and the second clutch mechanism CL2 is engaged. At this time, the phases of the hub 27 and the carrier 18 or the phases of the carrier 18 and the ring gear 16 are matched and the dog teeth 29 and 30 or the dog teeth 35 and 36 mesh with each other to generate actuation sound. When the contact guide area is changed in an environment in which the level of background noise of the engine 1 or other devices is low, the driver may feel discomfort. FIG. 13 illustrates a control example in which the driver's discomfort can be suppressed. In the control example illustrated in FIG. 13, determination is first made whether the vehicle is being stopped (Step S21). The determination in Step S21 can be made based on whether a vehicle speed detected by a vehicle speed sensor is lower than a predetermined vehicle speed.

When the result of the determination in Step S21 is "No" because the vehicle is not being stopped, this routine is terminated temporarily. When the result of the determination in Step S21 is "Yes" because the vehicle is being stopped, determination is made whether shifting to a parking range (P range) is made (Step S22). The determination in Step S22 can be made based on the position of a shift lever operated by the driver or based on whether the driver operates a button for selecting the parking range.

When the result of the determination in Step S22 is "No" because shifting to the parking range is not made, Step S22 is repeated. When the result of the determination in Step S22 is "Yes" because shifting to the parking range is made, the contact guide area is changed (Step S23). Then, determination is made whether the contact guide area changing is completed (Step S24). Step S23 and Step S24 are similar to Step S3 and Step S4 of FIG. 10, respectively.

When the result of the determination in Step S24 is "No" because the contact guide area changing is not completed, Step S24 is repeated until the contact guide area changing is completed. When the result of the determination in Step S24 is "Yes" because the contact guide area changing is completed, this routine is terminated temporarily.

By changing the contact guide area under the condition that shifting to the parking range is made, the actuation sound of the first clutch mechanism CL1 or the second clutch mechanism CL2 is generated simultaneously with background noise generated when a parking gear (not illustrated) is locked. Thus, the possibility of driver's discomfort can be reduced.

When the contact guide area is changed under the condition that the ready-ON operation or the ready-OFF operation is set or shifting to the parking range is made as in the control examples described above, the duration of time before the contact guide area is switched next time may vary widely.

Figure 14:
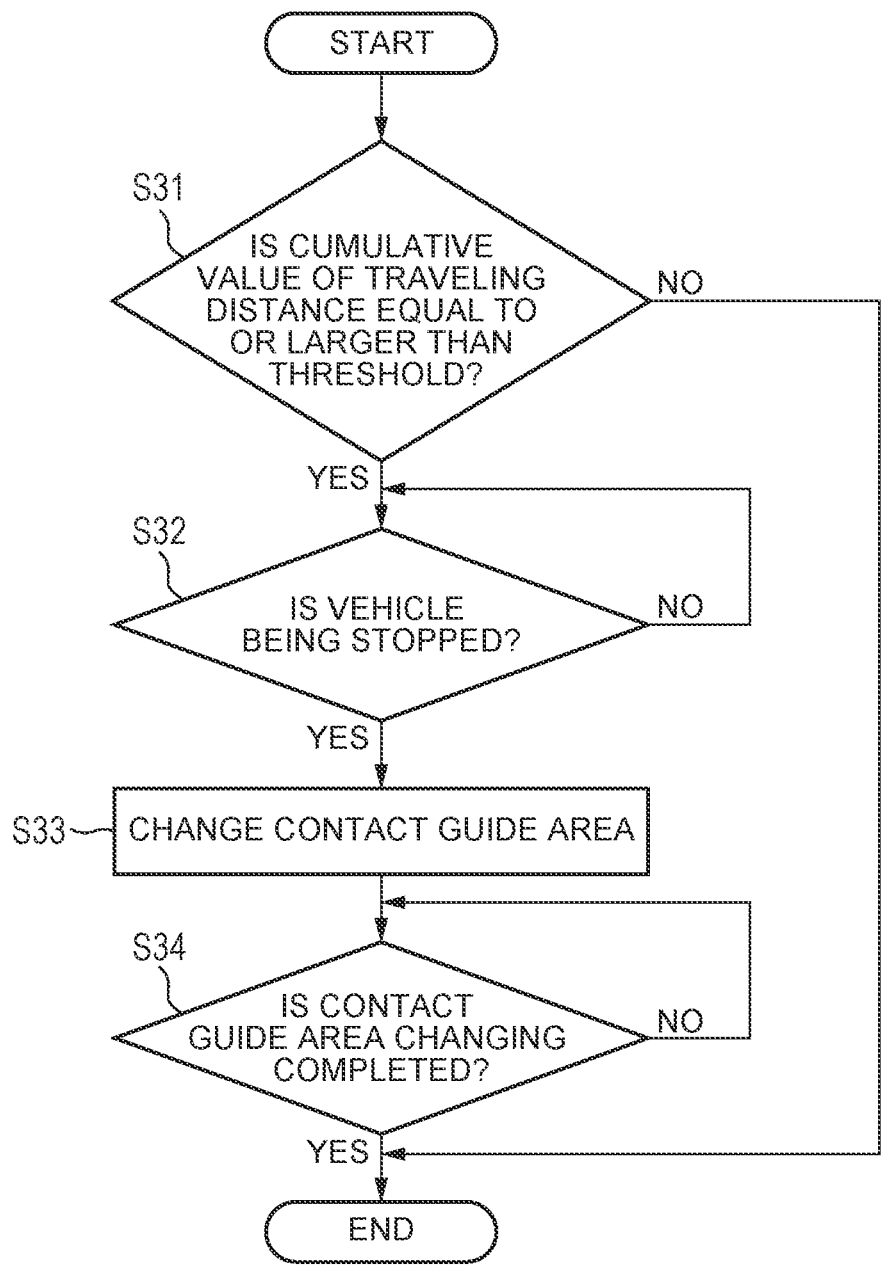
FIG. 14 is a flowchart for describing a control example in which the contact guide area is switched depending on a cumulative value of a traveling distance.

Therefore, the usage period may vary from guide area to guide area, namely, it is short on some occasions and long on others. That is, the amounts of wear in the cam grooves 23 and 24 in one guide area may differ from the amounts of wear in the cam grooves 23 and 24 in the other guide area. Therefore, the contact guide area is preferably changed depending on a cumulative value of a traveling distance. FIG. 14 is a flowchart for describing an example of the control.

In the control example illustrated in FIG. 14, determination is first made whether a cumulative value of a traveling distance after a current contact guide area is set is equal to or larger than a threshold (Step S31). The determination in Step S31 can be made by measuring the traveling distance from the time when Step S34 described later is executed. The threshold in Step S31 is a distance determined in advance based on, for example, the rigidity of the shift drum 21. The threshold may be a fixed value or a variable depending on, for example, the magnitude of the driving torque while the vehicle is traveling.

When the result of the determination in Step S31 is "No" because the cumulative value of the traveling distance after the current contact guide area is set is smaller than the threshold, this routine is terminated temporarily. When the result of the determination in Step S31 is "Yes" because the cumulative value of the traveling distance after the current contact guide area is set is equal to or larger than the threshold, determination is made whether the vehicle is being stopped (Step S32). Step S32 is similar to Step S21. This determination can be made based on whether the vehicle speed detected by the vehicle speed sensor is equal to or lower than a predetermined value. The stop of the vehicle in Step S32 may include a stop at a traffic signal and a stop at a stop sign.

When the result of the determination in Step S32 is "No" because the vehicle is not being stopped, Step S32 is repeated. When the result of the determination in Step S32 is "Yes" because the vehicle is being stopped, the contact guide area is changed (Step S33). Then, determination is made whether the contact guide area changing is completed (Step S34). Step S33 and Step S34 are similar to Steps S3 and S23 and Steps S4 and S24, respectively.

When the result of the determination in Step S34 is "No" because the contact guide area changing is not completed, Step S34 is repeated until the contact guide area changing is completed. When the result of the determination in Step S34 is "Yes" because the contact guide area changing is completed, this routine is terminated temporarily. When the result of the determination in Step S34 is "Yes", the cumulative value of the traveling distance is reset, and the measurement of the traveling distance is started again.

By changing the contact guide area depending on the cumulative value of the traveling distance, the local wear in the cam grooves 23 and 24 can be suppressed. Further, the frequency of the contact guide area changing can be reduced. Therefore, energy consumption of the actuator 22 can be reduced, or a decrease in the durability of the actuator 22 can be suppressed. Alternatively, the frequency of shock or abnormal noise along with the contact guide area changing can be reduced, and driver's discomfort can be suppressed. The control example illustrated in FIG. 10, FIG. 12, or FIG. 13 may be combined with the control example illustrated in FIG. 14. That is, when the result of the determination in Step S31 is "Yes", determination may be made whether the ready-ON operation is set, the ready-OFF operation is set, or the parking gear is locked. The contact guide area may be changed when the result of this determination is "Yes".

Figure 15:
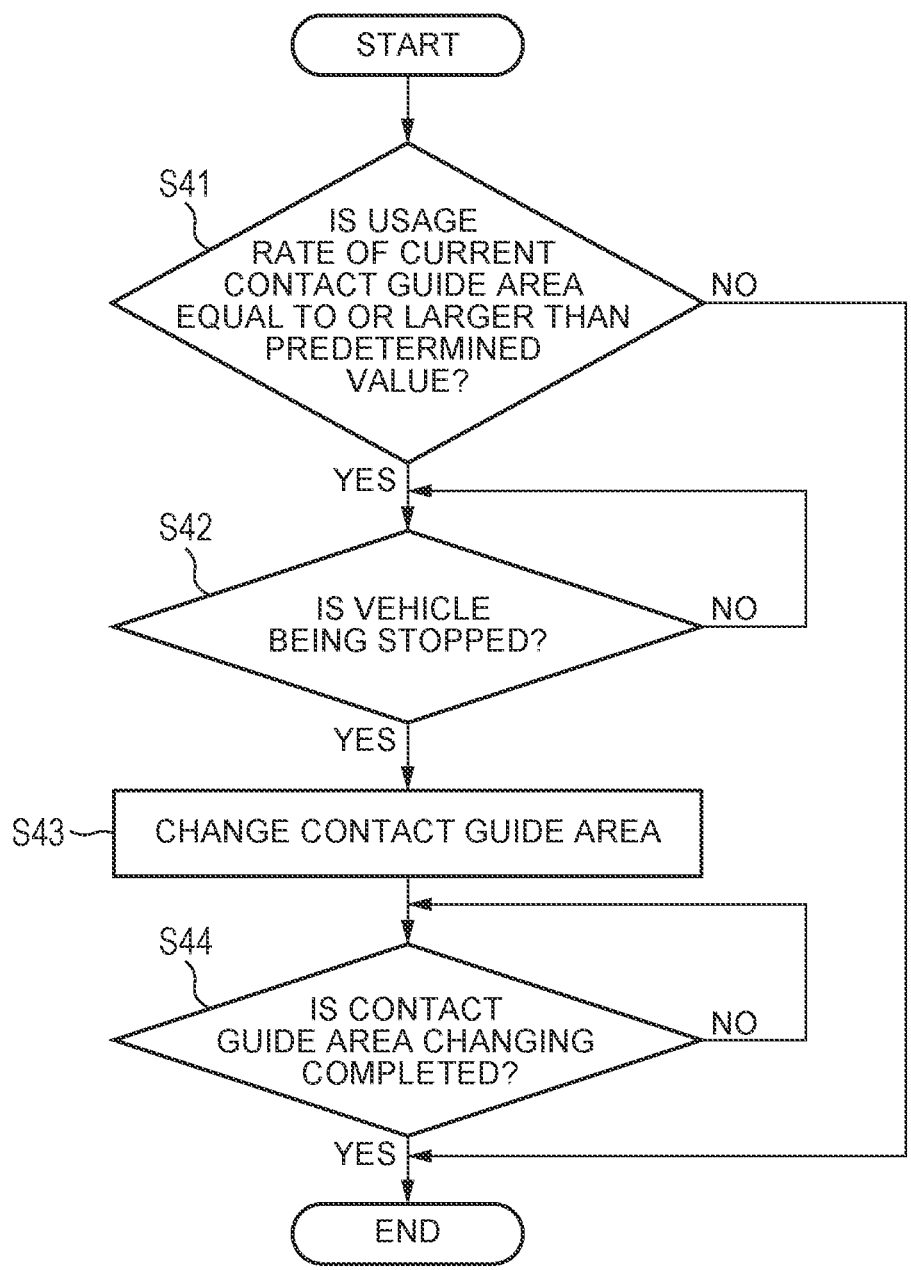
FIG. 15 is a flowchart for describing a control example in which the contact guide area is switched depending on the usage rates of the guide areas.

The control device for the power transmission mechanism according to the embodiment of the present disclosure may be configured to change the contact guide area when the usage rate of a current contact guide area is equal to or larger than a predetermined value. FIG. 15 illustrates an example of the control.

In the control example illustrated in FIG. 15, determination is first made whether the usage rate of the current contact guide area is equal to or larger than the predetermined value (Step S41). The usage rate in Step S41 corresponds to a cumulative time of use of the current contact guide area relative to a total traveling time. The determination in Step S41 can be made by determining contact guide areas during a traveling period based on values from a sensor that detects the rotation angle of the shift drum 21, and measuring, for each guide area, the time during which the guide area is used as the contact guide area.

When the result of the determination in Step S41 is "No" because the usage rate of the current contact guide area is smaller than the predetermined value, this routine is terminated temporarily. When the result of the determination in Step S41 is "Yes" because the usage rate of the current contact guide area is equal to or larger than the predetermined value, the contact guide area is changed because the current contact guide area is excessively used as compared to the other guide area. Similarly to Step S32 to Step S34, determination is made whether the vehicle is being stopped (Step S42). When the result of the determination in Step S42 is "Yes" because the vehicle is being stopped, the contact guide area is changed (Step S43). Then, determination is made whether the contact guide area changing is completed (Step S44).

When the result of the determination in Step S44 is "No" because the contact guide area changing is not completed, Step S44 is repeated until the contact guide area changing is completed. When the result of the determination in Step S44 is "Yes" because the contact guide area changing is completed, this routine is terminated temporarily.

By switching the contact guide area based on the usage rate of each of the guide areas, it is possible to reduce the occurrence of a case where some portions of the cam grooves 23 and 24 are used much more heavily than other portions thereof. That is, the local wear can be suppressed. Further, the frequency of the contact guide area changing can be reduced. Therefore, the energy consumption of the actuator 22 can be reduced, or the decrease in the durability of the actuator 22 can be suppressed. Alternatively, the frequency of shock or abnormal noise in the process of changing the contact guide area can be reduced, and driver's discomfort can be suppressed. The control example illustrated in FIG. 10, FIG. 12, or FIG. 13 may be combined with the control example illustrated in FIG. 15. That is, when the result of the determination in Step S41 is "Yes", determination may be made whether the ready-ON operation is set, the ready-OFF operation is set, or the parking gear is locked. The contact guide area may be changed when the result of this determination is "Yes".

The contact guide area is changed via the plurality of driving modes. As described above, the driving modes differ from each other in terms of the ratio of the torque to be transmitted from the engine 1 to the front wheels 5R and 5L and the magnitude of the reaction torque to be generated by the first motor 2. In the control examples illustrated in FIG. 10 and FIG. 12 to FIG. 15, the contact guide area is changed while the vehicle is being stopped in order to suppress a change in the driving force in the transition of the contact guide area changing, or to suppress complication of the torque control for the first motor 2.

Figure 16:
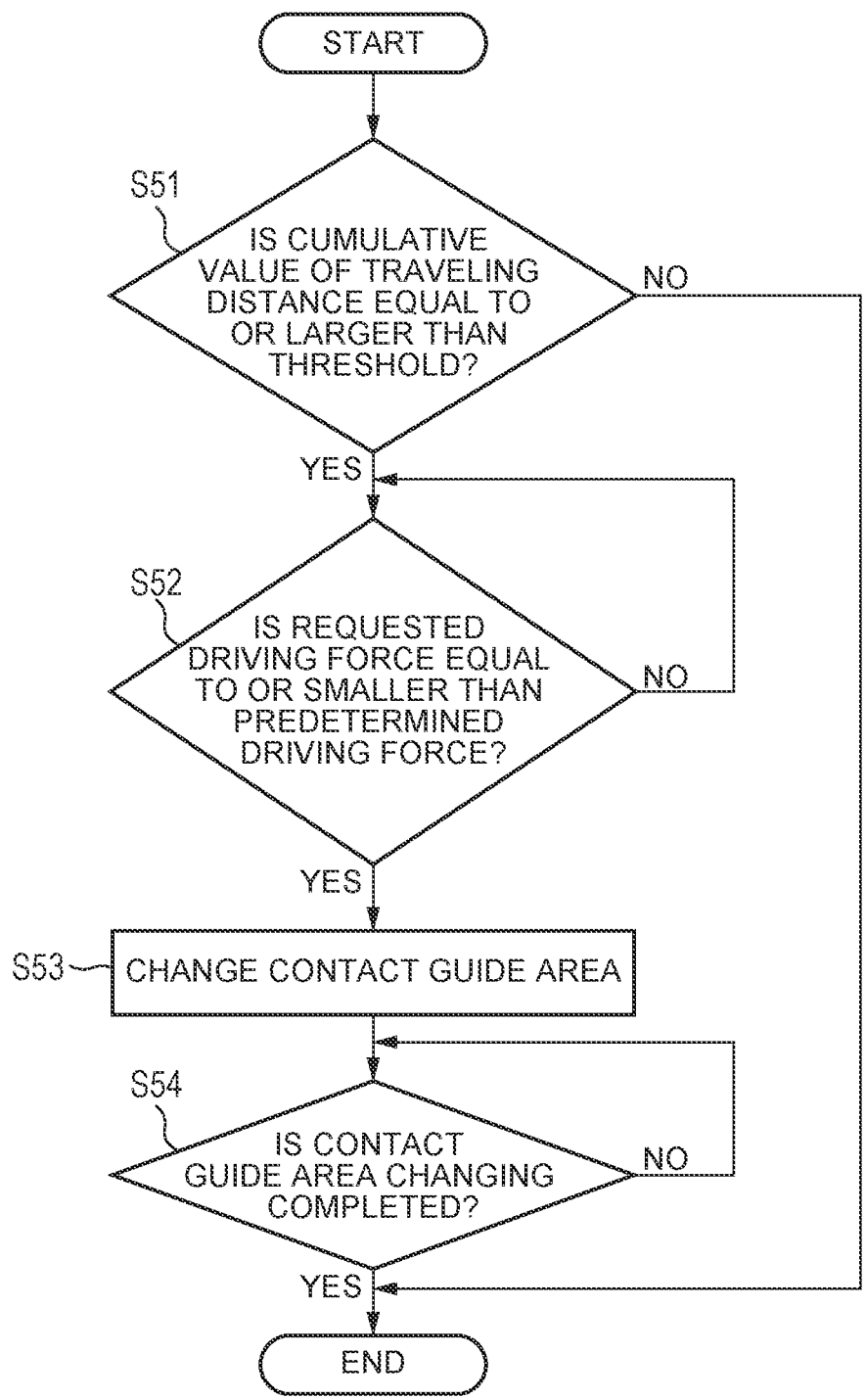
FIG. 16 is a flowchart for describing a control example in which the contact guide area is switched while the vehicle is traveling.

During steady driving in which the requested driving force is relatively small, the output torque of the engine 1 is relatively small. Even if the driving mode is changed and the increase rate of the torque is changed, the amount of change in the torque to be transmitted to the front wheels 5R and 5L is small because the output torque of the engine 1 is small. That is, the amount of change in the driving force is small. The amount of change in the reaction torque to be generated by the first motor 2 is also small. Even if the contact guide area is changed when the requested driving force is small, the change in the driving force is small, and the possibility of complication of the torque control for the first motor 2 is low. Therefore, the control device for the power transmission mechanism according to the embodiment of the present disclosure may change the contact guide area when the requested driving force is equal to or smaller than a predetermined driving force. FIG. 16 is a flowchart for describing an example of the control.

In the control example illustrated in FIG. 16, determination is first made whether a cumulative value of a traveling distance after a current contact guide area is set is equal to or larger than the threshold, similar to Step S31 of FIG. 14 (Step S51). When the result of the determination in Step S51 is "No" because the cumulative value of the traveling distance after the current contact guide area is set is smaller than the threshold, this routine is terminated temporarily. When the result of the determination in Step S51 is "Yes" because the cumulative value of the traveling distance after the current guide area is set is equal to or larger than the threshold, determination is made whether the vehicle is traveling and the requested driving force is equal to or smaller than the predetermined driving force (Step S52). The predetermined driving force in Step S52 can be set to such a driving force that, even if the driving mode is transiently changed and the increase rate of the torque is changed by changing the contact guide area while the vehicle is traveling, the change in the driving force is small and the possibility of complication of the torque control for the first motor 2 is low.

When the result of the determination in Step S52 is "No" because the requested driving force is larger than the predetermined driving force, Step S52 is repeated. When the result of the determination in Step S52 is "Yes" because the requested driving force is equal to or smaller than the predetermined driving force, the contact guide area is changed (Step S53). Then, determination is made whether the contact guide area changing is completed (Step S54). Step S53 and Step S54 are similar to Steps S3, S33, and S43 and Steps S4, S34, and S44, respectively.

When the result of the determination in Step S54 is "No" because the contact guide area changing is not completed, Step S54 is repeated until the contact guide area changing is completed. When the result of the determination in Step S54 is "Yes" because the contact guide area changing is completed, this routine is terminated temporarily. When the result of the determination in Step S54 is "Yes", the cumulative value of the traveling distance is reset, and the measurement of the traveling distance is started again.

By changing the contact guide area while the vehicle is traveling with a relatively small requested driving force, the amount of change in the driving force in the process of changing the contact guide area can be reduced, and driver's discomfort can be suppressed. Alternatively, the amount of change in the torque of the first motor 2 can be reduced, and therefore the complication of the control for the first motor 2 can be suppressed.

Even though the contact guide area is changed while the vehicle is traveling with a small requested driving force as described above, the torque to be transmitted from the engine 1 to the front wheels 5R and 5L fluctuates to some extent in the transition of the contact guide area changing. When the contact guide area is changed while the vehicle is traveling, the control device according to the embodiment of the present disclosure may control the torque of the second motor 3 to suppress a change in the driving force along with the contact guide area changing.

Specifically, the drive device 4 illustrated in FIG. 1 can cause the second motor 3 to increase or reduce the torque output from the power split device 6. The second motor 3 has a superior torque control response to that of the engine 1. Even if the torque output from the power split device 6 is changed along with the contact guide area changing, the torque of the second motor 3 can be controlled to follow the torque change rate. That is, the torque of the second motor 3 can be controlled to suppress the change in the driving force. By controlling the torque of the second motor 3, the change in the driving force can be suppressed even though the contact guide area is changed while the vehicle is traveling. Thus, the predetermined driving force is preferably set to a magnitude at which the change in the driving force can be suppressed by changing the torque of the second motor 3. That is, the predetermined driving force is preferably set such that the amount of change in the torque to be transmitted to the driven gear 38 is equal to or smaller than an amount of change in the torque to be transmitted to the driven gear 38 when the output torque of the second motor 3 is changed to an upper limit torque.

In the examples illustrated in FIG. 14, FIG. 15, and FIG. 16, the contact guide area is automatically changed without a driver's operation when the cumulative value of the traveling distance is equal to or larger than the threshold or when the usage rate of the current contact guide area is equal to or larger than the predetermined value. For example, when any one of the conditions described above is satisfied, an alert sound or an alert lamp on an instrument panel may be used to notify the driver of a timing to switch the contact guide area, and the contact guide area may be switched by a driver's switching operation or by a dealer.

The shift drum 21 illustrated in FIG. 2, FIG. 8, and FIG. 9 has the two guide areas where a sequence of driving modes can be set while the shift drum 21 makes one turn. The shift drum 21 may have three or more guide areas. If the shift drum 21 is formed with this structure, it is preferable that the usage rates of the guide areas (individual usage rates) be determined when a predetermined condition is satisfied and the contact guide area may be switched, and a current contact guide area be switched to a guide area having the lowest usage rate. By switching the current contact guide area to the guide area having a lower usage rate, it is possible to reduce the occurrence of a case where the amount of wear in the cam groove in one guide area differs from the amount of wear in the cam groove in the other guide area.

The structure of the operation mechanism according to the embodiment of the present disclosure is not limited to the structure in which the engaged state and the disengaged state of the engagement mechanism are switched by the shift drum and the movable member that engages with the cam groove formed in the shift drum. For example, the operation mechanism may be a translation cam including a rod having irregularities on its side face and movable in its axial direction, and a movable member provided in contact with the side face and configured to move in its axial direction depending on the irregularities of the rod when the rod moves in its axial direction. The engagement mechanism may be a friction engagement mechanism. In this case, the engagement mechanism may be configured such that a piston configured to press friction plates is brought into contact with a guide member such as a shift drum and an engaging position or a disengaging position of the piston or a torque transmission amount is controlled by controlling a movement amount of the guide member.

The shift drum 21 illustrated in FIG. 2, FIG. 8, and FIG. 9 has the two cam grooves 23 and 24, and the operation pins 25 and 31 engage with the respective cam grooves 23 and 24. For example, a plurality of operation pins may engage with one cam groove, and the operation pins (movable members) may move by rotation of the shift drum. Instead of the plurality of movable members, one movable member may move along one cam groove formed in the shift drum. That is, one engagement mechanism may be controlled.

What is claimed is:

1. A control device for a power transmission mechanism, the power transmission mechanism including:
   an engagement mechanism configured to be switched between an engaged state in which a torque for causing a vehicle to travel is transmitted and a disengaged state in which the torque is interrupted; and
   an operation mechanism configured to switch the engagement mechanism between the engaged state and the disengaged state, the operation mechanism including,
   a movable member coupled to the engagement mechanism, and configured to move to an engaging position where the engagement mechanism is set to the engaged state, and to move to a disengaging position where the engagement mechanism is set to the disengaged state, and
   a guide member provided in contact with the movable member and configured to move the movable member to the engaging position or to the disengaging position, the guide member including a plurality of guide areas provided in a continuous manner, each of the guide areas being configured to move relative to the movable member to guide the movable member to the engaging position or to the disengaging position,
   the control device comprising a controller configured to control the operation mechanism, the controller being configured to
   determine whether a predetermined condition related to traveling of the vehicle is satisfied, the predetermined condition including a condition that a vehicle speed is lower than a predetermined vehicle speed, and
   switch, when determining that the predetermined condition is satisfied, a contact guide area that is in contact with the movable member to guide the movable member to the engaging position or to the disengaging position, from a first guide area that is included in the plurality of guide areas and that has been in contact with the movable member to a second guide area that is included in the plurality of guide areas.

2. The control device for the power transmission mechanism according to claim 1, wherein the second guide area includes a part of the first guide area.

3. The control device for the power transmission mechanism according to claim 1, wherein
   the power transmission mechanism includes a parking lock mechanism configured to prohibit rotation of a driving wheel, and
   the predetermined condition includes a request to prohibit the rotation of the driving wheel by the parking lock mechanism.

4. The control device for the power transmission mechanism according to claim 1, wherein the controller is configured to;
  determine a cumulative value of a traveling distance after the movable member is brought into contact with the first guide area to guide the movable member to the engaging position or to the disengaging position; and
  switch, when the cumulative value of the traveling distance is equal to or larger than a threshold, the contact guide area that is in contact with the movable member to guide the movable member to the engaging position or to the disengaging position from the first guide area to the second guide area.

5. The control device for the power transmission mechanism according to claim 1, wherein the controller is configured to:
  determine a first usage rate corresponding to a period during which the movable member is brought into contact with the first guide area to guide the movable member to the engaging position or to the disengaging position relative to a traveling period of the vehicle; and
  switch, when the first usage rate is equal to or larger than a predetermined value, the contact guide area that is in contact with the movable member to guide the movable member to the engaging position or to the disengaging position from the first guide area to the second guide area.

6. The control device for the power transmission mechanism according to claim 1, wherein
  the guide member includes three or more guide areas, and the controller is configured to:
    determine, for the respective guide areas, individual usage rates corresponding to periods during which the movable member is brought into contact with the guide areas to guide the movable member to the engaging position or to the disengaging position relative to a traveling period of the vehicle; and
    set, as the second guide area, a guide area having a lowest individual usage rate among the individual usage rates.

7. The control device for the power transmission mechanism according to claim 1, wherein
  the power transmission mechanism is configured to change increase rates of a torque to be transmitted from a drive source of the vehicle to a driving wheel by switching the engaged state and the disengaged state of the engagement mechanism, and
  each of the guide areas is configured such that the guide member moves relative to the movable member to set at least two increase rates out of the increase rates of the torque to be transmitted from the drive source of the vehicle to the driving wheel.

8. The control device for the power transmission mechanism according to claim 7, wherein the predetermined condition includes a condition that a requested driving force of the vehicle is equal to or smaller than a predetermined driving force.

9. The control device for the power transmission mechanism according to claim 8, wherein the predetermined driving force is set to a driving force at which an amount of change in an acceleration of the vehicle in a process of switching the contact guide area, that is in contact with the movable member to guide the movable member to the engaging position or to the disengaging position, from the first guide area to the second guide area is equal to or smaller than a predetermined change amount.

10. The control device for the power transmission mechanism according to claim 8, the vehicle further comprising:
  a rotational member configured to transmit a torque from the power transmission mechanism; and
  a motor configured to change the torque of the rotational member, wherein
  the predetermined driving force is set to a driving force at which an amount of change in the torque to be transmitted to the rotational member in a process of switching the contact guide area, that is in contact with the movable member to guide the movable member to the engaging position or to the disengaging position, from the first guide area to the second guide area is equal to or smaller than an amount of change in the torque to be transmitted to the rotational member when a torque of the motor is changed to an upper limit torque.

11. The control device for the power transmission mechanism according to claim 7, wherein
  the controller is configured to switch the contact guide area, that is in contact with the movable member to guide the movable member to the engaging position or to the disengaging position, from the first guide area to the second guide area such that an increase rate of the torque before switching of the contact guide area is the same as an increase rate of the torque after switching of the contact guide area.

12. A control device for a power transmission mechanism, the power transmission mechanism including:
  an engagement mechanism configured to be switched between an engaged state in which a torque for causing a vehicle to travel is transmitted and a disengaged state in which the torque is interrupted; and
  an operation mechanism configured to switch the engagement mechanism between the engaged state and the disengaged state, the operation mechanism including,
    a movable member coupled to the engagement mechanism, and configured to move to an engaging position where the engagement mechanism is set to the engaged state, and to move to a disengaging position where the engagement mechanism is set to the disengaged state, and
    a guide member provided in contact with the movable member and configured to move the movable member to the engaging position or to the disengaging position, the guide member including a plurality of guide areas provided in a continuous manner, each of the guide areas being configured to move relative to the movable member to guide the movable member to the engaging position or to the disengaging position,
  the control device comprising a controller configured to control the operation mechanism, the controller being configured to
    determine whether a predetermined condition related to traveling of the vehicle is satisfied, the predetermined condition including a request to switch an untravelable state to a travelable state, and
    switch, when determining that the predetermined condition is satisfied, a contact guide area that is in contact with the movable member to guide the movable member to the engaging position or to the disengaging position, from a first guide area that is included in the plurality of guide areas and that has been in contact with the movable member to a second guide area that is included in the plurality of guide areas.

13. A control device for a power transmission mechanism, the power transmission mechanism including:
  an engagement mechanism configured to be switched between an engaged state in which a torque for causing a vehicle to travel is transmitted and a disengaged state in which the torque is interrupted; and
  an operation mechanism configured to switch the engagement mechanism between the engaged state and the disengaged state, the operation mechanism including,
    a movable member coupled to the engagement mechanism, and configured to move to an engaging position where the engagement mechanism is set to the engaged state, and to move to a disengaging position where the engagement mechanism is set to the disengaged state, and
    a guide member provided in contact with the movable member and configured to move the movable member to the engaging position or to the disengaging position, the guide member including a plurality of guide areas provided in a continuous manner, each of the guide areas being configured to move relative to the movable member to guide the movable member to the engaging position or to the disengaging position,
  the control device comprising a controller configured to control the operation mechanism, the controller being configured to
    determine whether a predetermined condition related to traveling of the vehicle is satisfied, the predetermined condition including a request to switch a travelable state to an untravelable state, and
    switch, when determining that the predetermined condition is satisfied, a contact guide area that is in contact with the movable member to guide the movable member to the engaging position or to the disengaging position, from a first guide area that is included in the plurality of guide areas and that has been in contact with the movable member to a second guide area that is included in the plurality of guide areas.

* * * * *